(12) United States Patent
Feigl et al.

(10) Patent No.: US 11,787,090 B2
(45) Date of Patent: Oct. 17, 2023

(54) APPARATUS FOR HEATING PLASTIC PREFORMS WITH STATIONARY APPLICATOR

(71) Applicant: KRONES AG, Neutraubling (DE)

(72) Inventors: Alexander Feigl, Mintraching (DE); Christian Betz, Geigant (DE); Johann Zimmerer, Bernhardswald (DE); Konrad Senn, Alteglofsheim (DE); Christian Compera, Schoenau (DE)

(73) Assignee: KRONES AG

( * ) Notice: Subject to any disclaimer, the term of this patent is extended or adjusted under 35 U.S.C. 154(b) by 802 days.

(21) Appl. No.: 16/645,347

(22) PCT Filed: Sep. 6, 2018

(86) PCT No.: PCT/EP2018/073969
§ 371 (c)(1),
(2) Date: Mar. 6, 2020

(87) PCT Pub. No.: WO2019/048528
PCT Pub. Date: Mar. 14, 2019

(65) Prior Publication Data
US 2021/0046677 A1    Feb. 18, 2021

(30) Foreign Application Priority Data
Sep. 6, 2017 (DE) .................. 10 2017 120 551.9

(51) Int. Cl.
*H05B 6/68* (2006.01)
*H05B 6/76* (2006.01)
(Continued)

(52) U.S. Cl.
CPC ....... *B29C 35/0805* (2013.01); *B25J 15/0047* (2013.01); *B29C 49/4205* (2013.01);
(Continued)

(58) Field of Classification Search
CPC ............... B25J 15/0047; F27D 2003/0068; F27D 3/12; H05B 3/80; H05B 6/6411;
(Continued)

(56) References Cited

U.S. PATENT DOCUMENTS

| | | | |
|---|---|---|---|
| 4,342,895 A | 8/1982 | Krishnakumar et al. | 219/10.41 |
| 8,664,574 B2 | 3/2014 | Senn et al. | 219/756 |

(Continued)

FOREIGN PATENT DOCUMENTS

| | | | | |
|---|---|---|---|---|
| DE | 10 2008 024 108 | 11/2009 | ............. | B29C 49/64 |
| DE | 10 2010 055 188 | 7/2012 | ............. | B29C 49/64 |

(Continued)

OTHER PUBLICATIONS

German Search Report issued in German Patent Appln. No. 10 2017 120 551.9, dated Jul. 19, 2018, 8 pgs.
(Continued)

*Primary Examiner* — Quang T Van
(74) *Attorney, Agent, or Firm* — HAYES SOLOWAY P.C.

(57) ABSTRACT

An apparatus for heating plastic preforms with a transport device which includes holding devices for holding the plastic preforms and wherein the transport path has at least one heating portion inside which the plastic preforms are heated, and with a heating device arranged stationarily at least in portions along the transport path and which heats the plastic preforms transported by the transport device during their transport through the heating portion, wherein the heating device has at least one in particular stationary applicator device which is configured for bombarding the plastic preforms with microwaves to heat them. In the heating portion, the transport device is arranged relative to the applicator device such that at least parts of the holding devices are arranged outside the applicator device, wherein
(Continued)

the applicator device is configured to receive several plastic preforms simultaneously for at least some of the time.

20 Claims, 20 Drawing Sheets

(51) Int. Cl.
| | |
|---|---|
| *B29C 35/08* | (2006.01) |
| *B25J 15/00* | (2006.01) |
| *B29C 49/42* | (2006.01) |
| *B29C 49/64* | (2006.01) |
| *F27D 3/12* | (2006.01) |
| *H05B 6/64* | (2006.01) |
| *H05B 6/70* | (2006.01) |
| *F27D 3/00* | (2006.01) |

(52) U.S. Cl.
CPC ...... *B29C 49/6418* (2013.01); *B29C 49/6445* (2013.01); *F27D 3/12* (2013.01); *H05B 6/6411* (2013.01); *H05B 6/68* (2013.01); *H05B 6/686* (2013.01); *H05B 6/701* (2013.01); *H05B 6/705* (2013.01); *H05B 6/76* (2013.01); *B29C 2035/0855* (2013.01); *F27D 2003/0068* (2013.01)

(58) Field of Classification Search
CPC .......... H05B 6/68; H05B 6/686; H05B 6/701; H05B 6/705; H05B 6/76
USPC ....... 219/678, 679, 690, 694, 695, 698, 700, 219/702, 761; 426/238, 246; 118/723 MW, 723 ME
See application file for complete search history.

(56) References Cited

U.S. PATENT DOCUMENTS

| | | | |
|---|---|---|---|
| 9,095,009 B2 | 7/2015 | Zimmerer et al. ....... | H05B 6/68 |
| 9,227,358 B2 | 1/2016 | Schoenberger et al. ..................... | B29C 49/78 |
| 2011/0084064 A1* | 4/2011 | Zimmerer ........... | B29C 49/6418 219/678 |
| 2014/0167301 A1* | 6/2014 | Schoenberger ..... | B29C 49/6409 425/135 |

FOREIGN PATENT DOCUMENTS

| | | | |
|---|---|---|---|
| DE | 10 2012 107 961 | 5/2014 | ............ B29C 49/68 |
| EP | 2 208 597 | 7/2010 | ............ B29C 35/08 |
| EP | 2 425 959 | 3/2012 | ............ B29C 49/64 |
| EP | 2 439 047 | 4/2012 | ............ B29C 49/68 |
| EP | 2 727 705 | 5/2014 | ............ B29C 49/64 |
| EP | 2 772 342 | 9/2014 | ............ B29C 49/42 |
| GB | 1 380 447 | 1/1975 | ............ B29C 17/02 |

OTHER PUBLICATIONS

International Search Report and Written Opinion issued in PCT/EP2018/073969, dated Dec. 6, 2018, with English translation, 24 pgs.
International Preliminary Report on Patentability issued in PCT/EP2018/073969, dated Mar. 10, 2020, 8 pgs.

\* cited by examiner

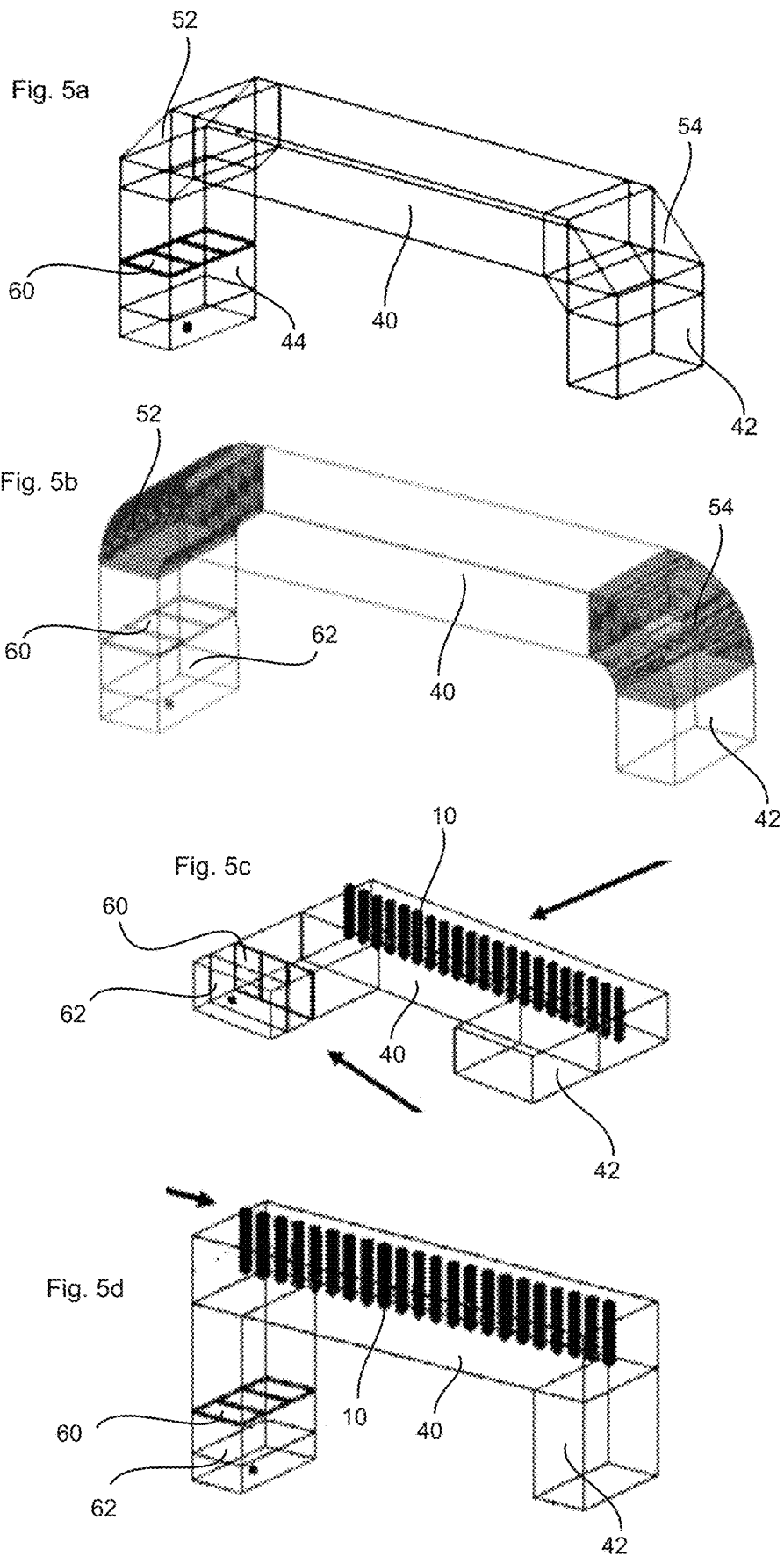

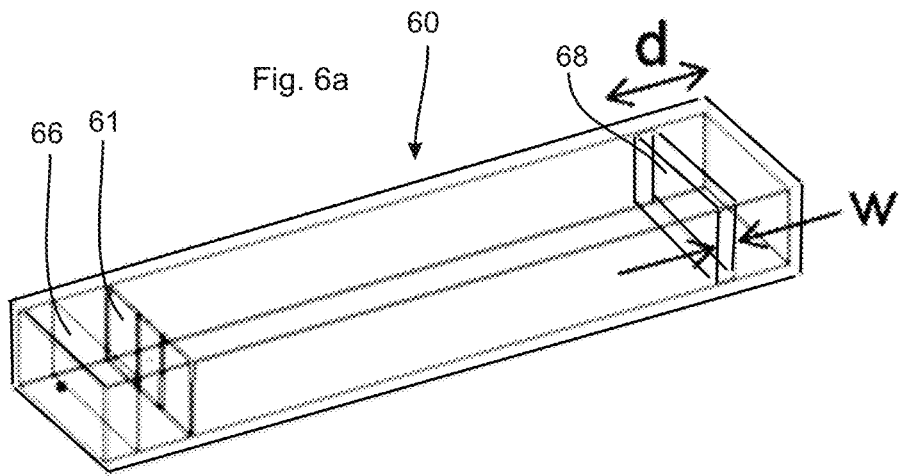
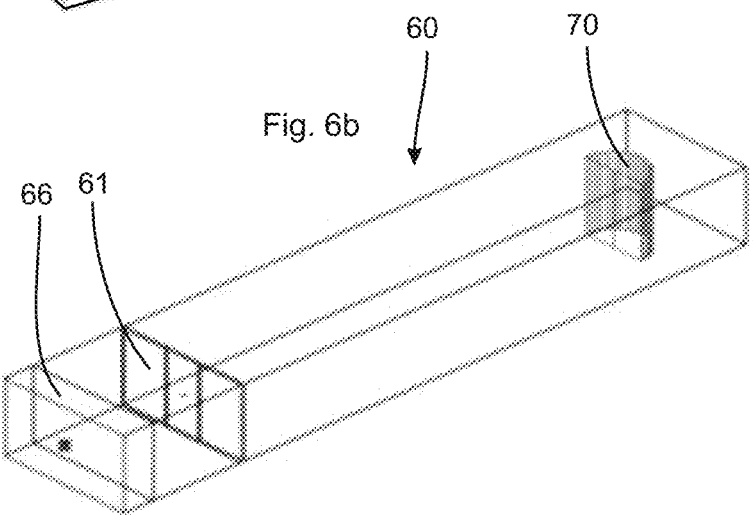
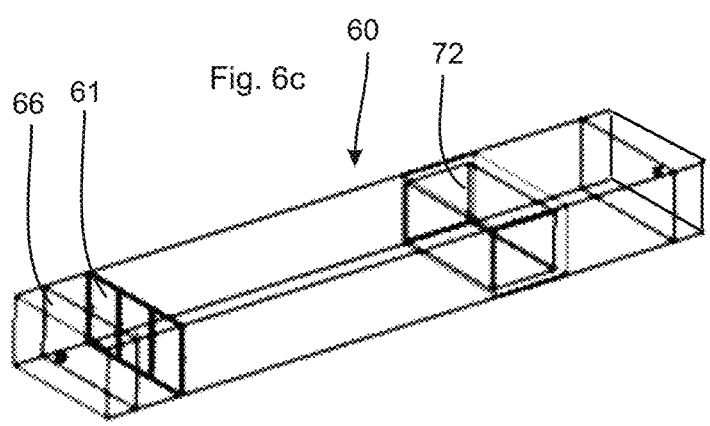

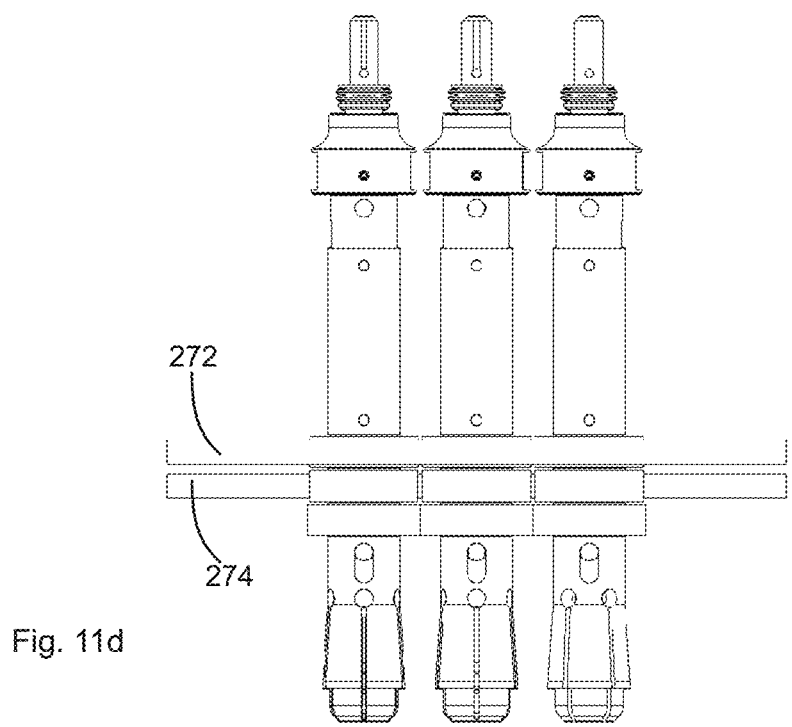
Fig. 11d
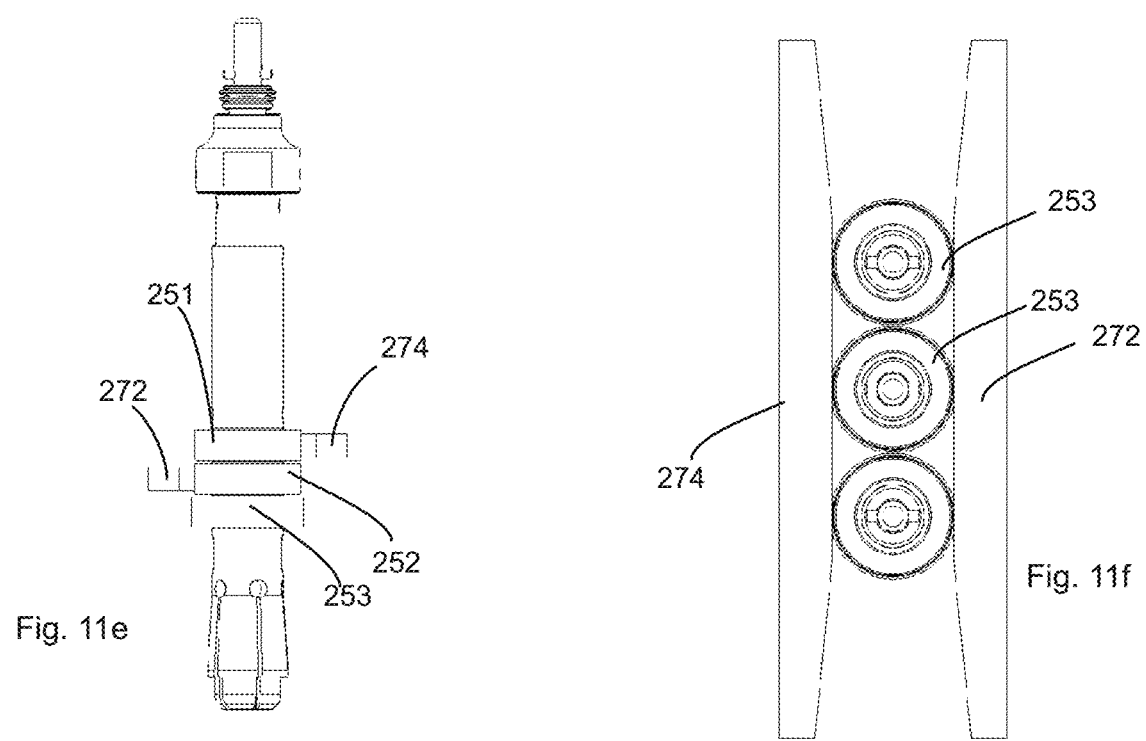
Fig. 11e
Fig. 11f

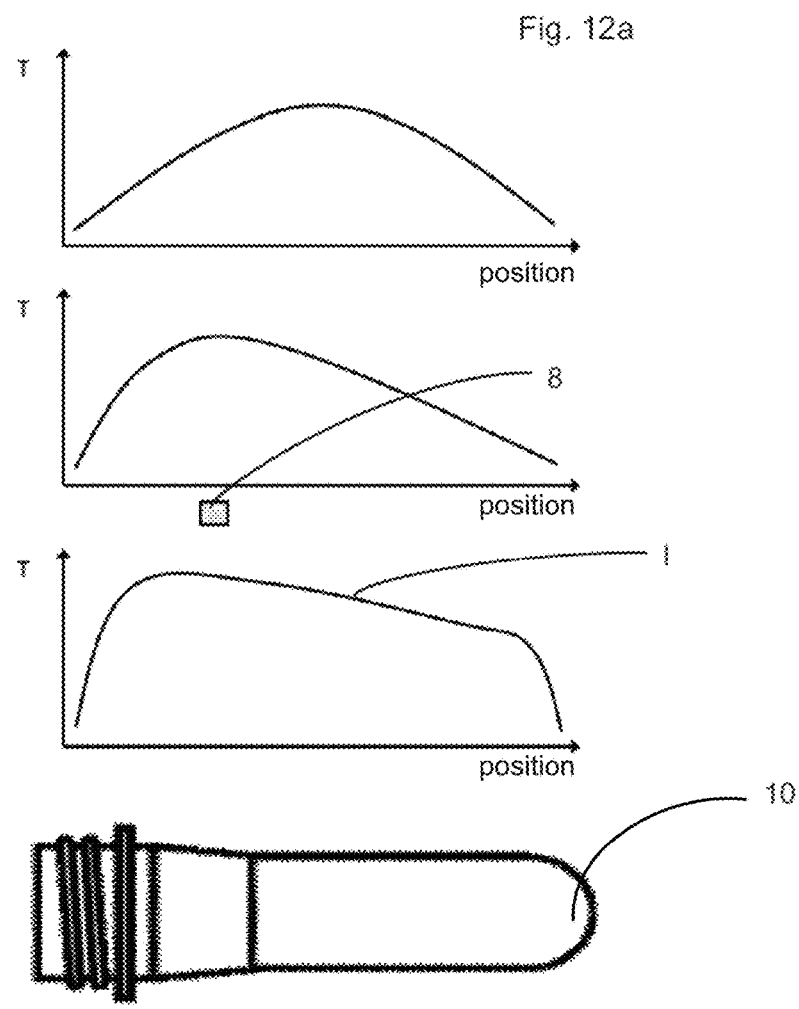
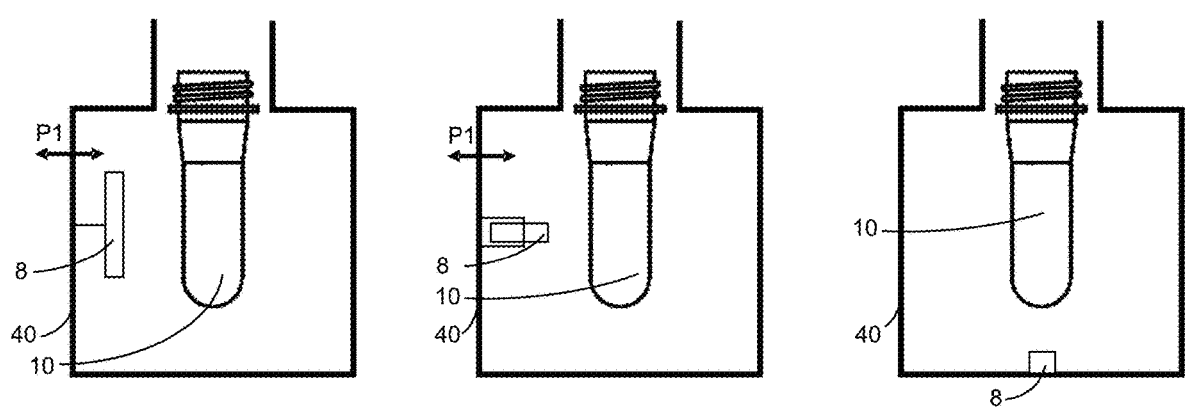
Fig. 12b  Fig. 12c  Fig. 12d

APPARATUS FOR HEATING PLASTIC PREFORMS WITH STATIONARY APPLICATOR

BACKGROUND OF THE INVENTION

The present invention relates to a device and a method for heating plastic preforms. In the drinks-producing industry, it is known that plastic preforms are heated and, in this heated state, expanded for example by a blow-moulding machine or a stretch blow-moulding machine. To heat these plastic preforms, usually infrared ovens are used. These infrared ovens have infrared heating elements, past which the plastic preforms are transported.

Recently, it has also been known to use microwave ovens for heating the plastic preforms. In these microwave ovens, a plurality of heating devices, in particular heating cavities, are arranged on a carrier. The plastic preforms are heated individually in these heating cavities. This procedure has proved successful but is relatively complex in design and production.

The present invention is therefore based on the object of creating a microwave heating device which is easier to handle in production compared with apparatus from the prior art.

SUMMARY OF THE INVENTION

An apparatus according to the invention for heating plastic preforms has a transport device which transports the plastic preforms along a predefined transport path. The transport device comprises holding devices for holding the plastic preforms, and the transport path has at least one heating portion inside which the plastic preforms are heated. The apparatus furthermore comprises a heating device which is arranged in particular stationarily at least in portions along the transport path and which heats the plastic preforms transported by the transport device during their transport through the heating portion. This heating device has an applicator device, and in particular a stationary applicator device which is suitable and intended for bombarding the plastic preforms with microwaves in order to heat them.

According to the invention, at least in the heating portion, the transport device is arranged relative to the applicator device such that at least parts of the holding devices are arranged outside the applicator device.

In the description below, instead of the term "applicator device", for simplicity the term "applicator" is used. Preferably, the applicator device is configured such that it is suitable and intended for receiving several plastic preforms simultaneously for at least some of the time. In particular therefore, for at least some of the time, two or more plastic preforms are situated in the applicator device and/or are transported through this simultaneously.

With this embodiment according to the invention, it is proposed to place the transport device at least partially outside the applicator device. In this way, it can be achieved that substantially only the plastic preforms are heated, and not components of the transport device, such as in particular but not exclusively the holding devices.

In this way, an efficient heating of the plastic preforms can be achieved, without risking damage to further elements of the apparatus and in particular the transport device.

In a further preferred embodiment, during their heating in the heating portion, the plastic preforms are transported in a direction perpendicular to their longitudinal axis. Preferably therefore, the transport device is suitable and intended for transporting the plastic preforms perpendicularly to their longitudinal direction.

Also, in this way it is easier to prevent the emergence of microwave radiation from the applicator device; above all, metallic conductive objects which reach from the outside into the applicator complicate an effective shielding of the applicator.

The present invention is furthermore aimed at an apparatus for heating plastic preforms which has a transport device which transports the plastic preforms along a predefined transport path, wherein the transport device comprises holding devices for holding the plastic preforms and wherein said transport path has at least one heating portion inside which the plastic preforms are heated. The apparatus furthermore comprises a heating device which is arranged in particular stationarily and in particular at least in portions along the transport path and which heats the plastic preforms transported by the transport device during their transport through the heating portion. The heating device has at least one in particular stationary applicator device which is suitable and intended for bombarding the plastic preforms with microwaves in order to heat them.

According to the invention, in this embodiment, the apparatus has a rotation device which rotates the plastic preforms, at least partially, around their longitudinal axis during their heating.

This rotation device may be configured such that it turns the holding devices with plastic preforms arranged thereon individually. Thus, the rotation device may comprise respective electric motors which are assigned to the individual holding devices of the plastic preforms.

Preferably however, a rotation device is provided which rotates the plastic preforms as a unit. The rotation device could for example comprise a toothed belt in which corresponding gear wheels, arranged on the individual holding devices, engage so that the transport movement of the holding devices simultaneously triggers the rotation of the holding devices. This toothed belt could be driven so that a rotational speed of the holding devices and in particular the plastic preforms arranged thereon can be changed.

Preferably, at least portions of the holding devices consist of dielectric material.

As stated, the applicator device (in both above-mentioned embodiments according to the invention) is in particular arranged stationarily. It would however also be conceivable that, conversely, the plastic preforms are arranged stationarily and the applicator device moves relative thereto. Preferably however, in contrast to the apparatus from the prior art as described above, the apparatus is constructed such that the plastic preforms are each heated by the same applicator device. Preferably, the transport device executes a relative movement between the plastic preforms and the applicator device, preferably a movement which stands perpendicular to a longitudinal direction of the plastic preforms.

In a preferred embodiment, the transport device is suitable and intended for transporting the plastic preforms separately. Thus, for example, the transport device may comprise a circulating transport chain on which the individual holding devices are arranged. In addition, however, it would also be possible for the transport device to comprise a carrier which in particular is configured as a linear motor, and for the individual holding devices to be arranged as shuttles which are movable relative to this carrier. It is also conceivable that this linear motor is provided at least partially with an individual coil actuation so that the carriers can be moved independently of each other. Preferably, a linear motor with longitudinal stator design is provided. Particularly preferably, at least one linear motor is provided with longitudinal stator design and individual coil actuation.

In a further advantageous embodiment, the apparatus comprises a microwave generating device which in particular is arranged outside the applicator device. Furthermore, the apparatus comprises a coupling device which couples the microwaves generated outside the applicator device into the applicator device.

Furthermore, it is possible that the applicator is constructed as an element or unit having a slot through which the plastic preforms are transported. The applicator device may be configured, as explained more precisely below, such that no microwaves or very little microwave radiation emerges from this gap. Particularly preferably, the transport device is suitable and intended for transporting the plastic preforms with speeds between 0.01 m/s and 5 m/s, preferably between 0.1 m/s and 1 m/s.

Particularly preferably, the apparatus has a rotation device which is suitable and intended for rotating the plastic preforms about their longitudinal axis, in particular during their heating. Particularly preferably, this rotation device is suitable and intended for achieving rotational speeds which lie between 1 and 2000 revolutions per minute, preferably between 50 and 1000 revolutions per minute, and in particular preferably between 300 and 900 revolutions per minute.

Particularly preferably, a rotational speed of the plastic preforms can be adjusted during their transport. In a further preferred embodiment, a control device may be provided which establishes a rotational speed of the plastic preforms depending on the transport speed with which they are transported through the transport device.

In a further advantageous embodiment, the transport device is suitable and intended for transporting the plastic preforms with a predefined mutual spacing. Particularly preferably, this spacing (relative to a centre of one plastic preform from the adjacent plastic preform) is greater than 10 mm, preferably greater than 15 mm, preferably greater than 20 mm, and particularly preferably greater than 30 mm. In a further preferred embodiment, this spacing is less than 300 mm, preferably less than 200 mm, preferably less than 100 mm and particularly preferably less than 50 mm.

With the apparatus according to the invention, the plastic preforms may be loaded or heated with the predefined temperature profile. This temperature profile in particular depends on the physical parameters of the plastic preforms used, i.e. for example their length, weight, cross-section and similar.

In principle, it is possible that the applicator is configured as a travelling wave guide or resonator. Advantageously, the applicator is designed or configured such that it allows an electrical field distribution adapted to the temperature profile to be achieved. It is possible that the slot or gap, through which the plastic preforms are guided during heating, lies symmetrically or substantially symmetrically (i.e. with deviations of up to a few millimetres) in the middle of the applicator. Furthermore, as explained more precisely below, it is possible that the applicator is open on at least one side, preferably on at least two sides, and particularly preferably on at least three sides. In this way, the plastic preforms can be guided through the applicator.

Particularly preferably, the apparatus comprises coupling and/or tuning regions which particularly preferably are arranged on the base of the applicator and/or at the sides of the applicator. These devices, such as for example tuning elements, are suitable and intended for adapting the resonance frequency of the applicator, which is partially or completely filled with plastic preforms, to the emission frequency of the microwave generating device.

In a further advantageous embodiment, the applicator has a supply region by which microwaves can be supplied to the applicator. The supply element may for example be a waveguide. As stated, advantageously the apparatus comprises a microwave generating device such as a magnetron which is arranged outside the applicator device.

In a further advantageous embodiment, the applicator also comprises at least one deflecting element which deflects the propagation direction of the microwaves, preferably by an angle which is greater than 30°, preferably greater than 70°. Particularly preferably, the deflecting device is suitable and intended for deflecting the microwaves or their propagation by an angle which is less than 180°, preferably less than 150°, preferably than 120° and particularly preferably less than 100°. Particularly preferably, the deflecting device deflects the propagation direction of the microwaves by 90°. Preferably, the applicator device is configured as a resonator device.

Here it would be possible that this deflecting device has rounded surfaces, but it would also be possible that the deflecting device has a plurality of sections running obliquely but straight.

Particularly preferably, the applicator device as mentioned above comprises a tuning region and a supply region. Particularly preferably, the region of the applicator through which the plastic preforms am transported is arranged between the supply region and the tuning region.

Particularly preferably, a design of the applicator or of the supply and tuning region is configured so as to minimise the risk of plasma arcs. This may be achieved amongst others by avoiding sharp corners or edges.

In a particularly preferred embodiment, the supply region comprises a supply window which consists of or comprises dielectric material. This window may be provided at the inlet region of the applicator, in particular for protecting a microwave generator. Particularly preferably this window is configured so as to form minimal interference with the field inside the applicator.

It is an objective to protect the microwave source from gases, particles etc. from the region of the applicator. Usually, to this end quartz plates are positioned at a suitable location on the supplying waveguide. In particular, dielectric materials with very low dielectric losses are suitable, such as for example $Al_2O_3$, quartz, Teflon.

As explained in more detail below, the apparatus furthermore comprises chokes, i.e. damping devices or shielding devices, in order to prevent as far as possible the emergence of microwaves from the applicator. In particular, an emergence of microwaves from the slot through which the plastic preforms are guided should be prevented as far as possible.

In a further advantageous embodiment, the microwave arrangement comprises at least one power source or power supply. Furthermore, the apparatus comprises at least one power head. This power head preferably has units such as a magnetron, launcher and/or solid-state element, a connection for a waveguide, a housing, electronics, and a water supply. In addition, an isolator may also be provided. Also, sensor devices may be provided such as sensor devices for detecting plasma, temperature sensors, and sensors for detecting outgoing or returning (microwave) power. In addition, a flow meter may be provided for through-flowing cooling water.

In a further advantageous embodiment, the microwave generating device comprises a magnetron and/or a so-called launcher (i.e. an arrangement for coupling the microwave radiation from the antenna of the magnetron into a waveguide and/or a coaxial conductor with low loss).

In addition, the microwaves may also be generated by a solid-state source. Furthermore, the apparatus preferably has an isolator, wherein particularly preferably a circulator and/or a water load may be provided.

The advantages of a solid-state source in particular are that the frequency can be adapted to the inherent frequency of the resonance system. In this way, any additional adaptation of frequency in the resonance system (tuning) may be omitted. Frequency adaptation can also take place very quickly.

In a further advantageous embodiment, the microwave generating device is configured to emit microwaves in a frequency range between 850 MHz and 980 MHz, preferably between 900 MHz and 930 MHz.

In a further advantageous embodiment, a power range of the microwave generator is between 0.1 kW and 1000 kW, preferably between 1 kW and 300 kW, and particularly preferably between 5 kW and 100 kW.

It would be possible to provide one or also several microwave sources. Particularly preferably, the number of microwaves sources is between 1 and 100, preferably between 1 and 10.

The entire apparatus may preferably comprise at least one such applicator, but it would also be conceivable for the apparatus to have more than one applicator, for example between 1 and 20 applicators and preferably between 2 and 6 applicators. These applicators may be arranged in series, i.e. in succession.

In a particularly preferred embodiment, the individual applicators are each assigned to specific microwave sources. Thus, it is possible that a microwave source is assigned to an applicator. It would however also be possible for several applicators to be assigned to one microwave source, and for example here a power splitter may be provided. Here it is again possible that the required microwave power originates from a magnetron or power distribution system which is based on power splitters. There are several possibilities for the design of the apparatus. Thus, starting from a power source, a plurality of generators may be provided, to each of which a microwave source is assigned.

These microwave sources may in turn each have an assigned isolator and starting from the isolator the power may be divided, in particular via a power splitter, over one, two or more applicators. In addition, it would be possible to provide an energy supply to which a voltage generator (or generally a power source) is connected. Starting from the voltage generator (i.e. the power source), the power is distributed over a plurality of microwave sources.

Preferably, a circulator and a water load and also an applicator are assigned to each of these microwave sources. Combinations of these procedures are also conceivable. In other words, different variants for dividing the energy over a plurality of applicators are conceivable.

It would also be possible to connect power splitters in series. Thus, starting from a microwave source, the microwaves may be divided by a power splitter over two or more branches, and starting from these branches again be divided over several applicators via further power splitters. It would also be possible that power is branched from a main part of the power distribution to individual applicators via a respective power splitter.

In a further advantageous embodiment, the applicator is of the type TE10n. In this design, one mode runs perpendicularly to the transport direction and perpendicularly to the longitudinal axis of the plastic preforms. Preferably, no modes run parallel to the longitudinal axis of the plastic preform. Preferably, n modes run parallel to the transport direction of the plastic preforms. Particularly preferably, the applicator is formed so as to be rectilinear, i.e. the plastic preforms are transported in a straight line inside the applicator. It would however also be conceivable for the applicator to be formed as a curve.

It would also be possible for the applicator to have straight and curved portions. If the applicator is formed as a curve, it preferably has an angle of curvature which lies between 1° and 200°, and particularly preferably between 90° and 180°.

Particularly preferably, the applicator as mentioned above has a slot through which the plastic preforms are guided. The transport device is preferably configured such that a mouth of the plastic preforms is not guided through the applicator or resonator. In this way, excessive heating of the mouth of the plastic preforms is prevented. Particularly preferably, the plastic preforms are transported transversely to their longitudinal direction inside the applicator.

The applicator is preferably configured such that a predefined number of maxima of the electric field is formed therein, preferably a number between 1 and 40 maxima, and preferably between 3 and 14 maxima, and preferably between 3 and 8 maxima.

Particularly preferably, the resonator may have a constricted slot region through which the plastic preform is guided. More precisely, this slot region may adjoin the resonator. The interior of the applicator may widen downward in the longitudinal direction of the plastic preform, or in the direction of a base dome of the plastic preform. In this way, an efficient damping of microwaves is achieved.

In a preferred embodiment, the apparatus comprises a coupling device which couples the microwaves into the applicator. This coupling device may particularly preferably have an aperture, and preferably an iris-like aperture. This aperture defines the inlet i.e. the coupling inlet of the applicator. A screen usually consists of a thin plate with an aperture which is smaller than the cross-section of the waveguide to be supplied and the cross-section of the applicator (preferably directly after the screen).

In a preferred embodiment, it is possible for this aperture to be adjustable. Thus, it is possible that a size of this aperture can be changed, however it would also be possible for a screen carrying the aperture to be displaceable, in particular displaceable in the coupling region, Particularly preferably, a screen with this aperture is displaceable in a straight direction. In addition, it is also possible for the effective width (coupling factor) of this iris or aperture to be adapted by the introduction of additional elements into the supply region, such as for example a metallic structure or dielectric structure. The interplay of the screen and the additional elements ideally always adapts the effective width (coupling factor) such that, with simultaneous tuning of the frequency, a power minimum is reflected by the applicator or resonator.

Furthermore, it is possible that the supply region be positioned differently relative to the applicator. In this way, the microwaves can be coupled in from the base or also from the side. Coupling in from the base of the applicator leads to a smaller leakage of microwaves, but coupling in from the side is also possible. Preferably, the microwaves are coupled in from the base of the applicator. Particularly preferably, the material channel is arranged at the top side of the applicator. Particularly preferably, the plastic preforms are transported through a slot arranged on the upper surface of the applicator.

Particularly preferably, the plastic preforms are transported through the applicator with their mouths upward. As stated, the radiation may optionally be coupled in from the side, i.e. the right or left side relative to the transport path of the applicator. In addition, a coaxial input is possible starting from the microwave source, i.e. in the longitudinal direction of the applicator. Preferably, in this case the coupling is not defined by an iris but by a transition from a coaxial conductor into the waveguide. Particularly preferably, in this case the applicator may comprise a coaxial conductor input.

In a particularly preferred embodiment, the transport device is configured or arranged, at least in the heating region, such that at least parts of the plastic preforms are transported outside the applicator device and/or outside the region in which microwaves are present. In a further preferred embodiment, the holding elements are arranged at least partially above the applicator device.

In this way, it is achieved that the holding devices themselves are not or at least only slightly influenced or heated by the microwaves.

In a further advantageous embodiment, the holding devices are configured as internal gripper devices which are at least in portions engage in the mouths of the plastic preforms in order to hold these. However, also external grippers may be used which in particular hold the plastic preforms at their securing ring and/or theft carrier ring and/or the regions between the securing ring and the carrier ring.

In the following, the holding devices which are preferably used for the apparatus according to the invention are described in detail below. It is however pointed out that these holding devices may also be used for other purposes. The applicant therefore reserves the right to also claim the embodiment of the holding devices described here separately.

Holding devices according to the invention for holding unitary goods, in particular containers and in particular plastic preforms, have a first fixing portion with which they can be attached to a transport device, such as a transport chain. Furthermore, the holding devices have engagement or holding means which are suitable and intended for holding plastic preforms. In particular, these means are an internal gripper element which can engage in the mouth of the plastic preforms. Particularly preferably, in a region between the fixing portion and the holding portion, the holding devices have guide devices which in particular serve for lateral guidance and for guidance in the transport direction of the holding elements.

This embodiment is relevant in particular when the holding devices themselves have a great length, i.e. a great length in the longitudinal direction of the plastic preforms. Usually in the prior art, plastic preforms are transported through a heating device by comparatively short holding devices, in particular on a chain. The length of the plastic preform gripper is selected such that a good circulation can be guaranteed with normal mechanical suspension and also on rotation of the plastic preform gripper with attached plastic preforms. This means that the plastic preform circulates even at a high rotational speed.

If the holding devices are too long, which is advantageous in particular for the present application of a microwave applicator (since the actual transport device can then be spaced very far from the applicator device), a good circulation of the container can no longer be guaranteed. As a result, firstly a subsequent process may not function, and secondly in the worst case the container to be transported may be lost.

The invention therefore proposes that the holding elements are guided and in particular guided in centred fashion in one region. A guide device may be provided which provides guidance in several directions, preferably in at least two opposite directions and/or in two mutually perpendicular directions, particularly preferably in all directions. Preferably however, these directions are perpendicular to a longitudinal direction of the plastic preforms.

Preferably, guidance can be achieved both in the transport direction and in a direction standing perpendicularly to the transport direction. In a particularly preferred embodiment, said guide device comprises at least one mounting device, i.e. in particular an internal ring on which an external ring is rotatably mounted. This external ring may for example be in contact with a corresponding external ring of an adjacent holding device (i.e. adjacent in or against the direction of running). This external ring may also be in contact with a lateral guide in order thus to guide the plastic preforms laterally in every direction. In this way, even with a lengthening of the holding devices, the circulation of the holding device and container to be transported can be improved. Due to the rotatable mounting of the holding device, in particular a rotation of the plastic preforms about their longitudinal direction can be achieved.

Preferably therefore, the holding device has at least one element for rolling against a further element, such as for example a guide curve. This element is in particular mounted rotatably relative to a longitudinal direction of the holding device and/or the plastic preform.

In a preferred embodiment, the guide device has at least two such rotational bearings, particularly preferably three such rotational bearings. The two rotational bearings are preferably arranged above each other in a longitudinal direction of the holding device and/or the longitudinal direction of the plastic preforms. Thus, it would be possible and preferred for the two rotational bearings to be mounted rotatably and coaxially relative to the longitudinal direction of the plastic preforms, but it would also be conceivable that the rotational bearings are mounted rotationally relative to axes which are laterally offset to each other in a direction relative to the longitudinal direction of the plastic preforms.

One of these bearings may be suitable for rolling on a guide element arranged at the left relative to the transport direction, and a second bearing device may be suitable and intended for rolling on a guide element on the right, and the third bearing device may be suitable and intended for rolling on a corresponding guide device of the adjacent holding element. Preferably, these rotational bearings are rotatable independently of each other, and in particular are not coupled together. Preferably, the rotational bearings are roller bearings, and in particular ball bearings.

This embodiment is explained in more detail with reference to the figures. Particularly preferably, the guide devices are arranged directly above each other in the longitudinal direction of the plastic preforms or in the longitudinal direction of the holding device. Particularly preferably, the guide device is arranged closer, in the longitudinal direction of the holding device, to the gripper element which engages in the mouths of the plastic preforms. In a further advantageous embodiment, one of the guide devices has a larger cross-section than at least one other of the guide devices, and particularly preferably than the two other guide devices. This guide device is in particular the guide device which is in contact with the guide device of an adjacent holding element.

Particularly preferably, therefore, the holding device has at least one element for rolling in the circumferential direction. In a particularly preferred embodiment, the holding devices comprise at least one separating element for lengthening the holding device in the longitudinal direction. Here it would be conceivable that the holding device has a telescopic element which allows lengthening or shortening of the holding device.

In a further advantageous embodiment, the holding device is made at least partially of a material which is selected from a dielectric and/or a non-dielectric material or similar. Particularly preferably, the holding device is designed such that, as stated above, it is guided laterally and/or in the running direction and/or against the running direction relative to a successive or adjacent holding device or holding element.

In a further advantageous embodiment, mutually adjacent holding devices can be rotated independently of each other. Particularly preferably, the holding devices may also travel independently of each other in a longitudinal direction of the plastic preforms. In this way, not only can the plastic preforms be transported, but a lifting and lowering movement can also be achieved, in particular in the longitudinal direction of the plastic preforms.

The present invention is furthermore directed at a transport device for transporting containers and in particular plastic preforms, which comprises at least one holding device and preferably a plurality of holding devices of the type described above.

In a further advantageous embodiment, the holding devices are made at least partially of a material which cannot or can only slightly be heated by microwaves. Advantageously, this material is selected from a group of materials containing for example PTFE, PEI, PP, $AL_2O_3$ or similar.

In a further advantageous embodiment, the apparatus has a shielding device which at least partially prevents the emergence of microwaves from the applicator device.

This shielding device serves in particular to shield and/or reduce the emergence of microwaves from the applicator device. In a preferred embodiment, the shielding device is constructed in multiple stages, preferably at least two stages. Preferably therefore, the shielding device is constructed from several elements or shielding units. Preferably, the shielding device therefore comprises at least two shielding units which preferably each serve to shield microwaves and are preferably arranged successively in a running direction of the microwaves.

Preferably, the shielding units are different in structure and achieve the shielding of the microwaves based on different principles. The shielding units are preferably formed from a group of shielding units which contain cut-off elements (or cut-off structures), chokes, absorbers and radiation-tight structures.

In the context of the cut-off structure, the waveguide is locally constricted so far that parts of the microwaves cannot be coupled out and/or propagated and are thus shielded and/or damped. In the context of the choke device, the microwaves are preferably shielded and/or damped by destructive interference. In the context of the absorber, microwaves are absorbed in fluids or solid bodies. Radiation-tight structures include metallic conductive surfaces or grids with a mesh with which is very much smaller than the wavelength.

Preferably, the shielding unit is constructed in at least three stages. In a further preferred embodiment, firstly a cut-off structure adjoins the applicator device. Preferably, a choke device adjoins this cut-off structure as a second shielding unit. Preferably, at least one shielding unit is arranged directly on the applicator device. Particularly preferably, the cut-off structure and/or the choke device are in particular arranged on the applicator device.

In a further preferred embodiment, at least one shielding device and/or a stage of the shielding device has a structure comprising a plurality of protrusions. These protrusions may be formed as rods, preferably as rods or protrusions which extend perpendicularly to a longitudinal direction of the plastic preforms.

Preferably, these protrusions are formed in a regular pattern and in particular are regularly spaced from each other. It would be possible that these protrusions are configured similarly to each other. Also the protrusions may be arranged in a plane.

In a further preferred embodiment, the cut-off structure has a recess in the form of a waveguide which has the function of a lambda/fourth ($\lambda/4$) trap.

As stated above, the applicator device preferably has a slot through which the plastic preforms are guided. Advantageously, the applicator device also has an opening at a starting region and at an end region, namely in the inlet region of the plastic preforms and in the outlet region of the plastic preforms. In principle, microwaves can emerge from the slots or openings, which should be prevented as far as possible.

The following measures, which serve to prevent microwaves from emerging from the applicator and/or resonator, may also be used without the invention described above, i.e. in particular without the feature that rotation devices are present for rotating the plastic preforms and/or that the transport device is arranged at least partially outside the applicator device. These measures serve to reduce the emergence of microwaves outside the housing of the machine or applicator device, and in particular reduce this to a value which is less than 10 $mW/cm^2$, preferably less than 2.5 $mW/cm^2$ in a wavelength range of 915 MHz.

Preferably, at least one region of the applicator device and preferably at least one wall of the applicator device is equipped at least partially with a plurality of protrusions which prevent microwave leakage. This wall in particular extends beyond the slot through which the plastic preforms are guided. Advantageously, this wall with protrusions extends beyond all said slots or openings of the applicator device. These protrusions, also referred to below as chokes, are a plurality of protrusions which, starting from said wall, preferably point perpendicularly to the slot and/or perpendicularly to the transport direction of the plastic preforms.

These protrusions may be formed as pins and point in the direction of the transport path of the plastic preforms. In a preferred embodiment therefore, the wall of the applicator device, preferably at least one and particularly preferably precisely one wall of the applicator device, is equipped with a plurality of such protrusions. Preferably at least one and particularly preferably only one region of this wall is equipped with protrusions and lies outside the applicator device or outside the region in which the plastic preforms are heated.

Advantageously, these protrusions or structures consist of metal (or in some cases dielectric materials) in order to prevent the emergence of microwaves. In addition or alternatively, microwave-absorbing structures may be used. In a preferred embodiment, the material of the channel or gap through which the plastic preforms are transported is formed as a combination of chokes and structures of absorbent material.

Preferably, the materials are dielectric and/or metallic materials. In a preferred embodiment, these protrusions are formed by several rows of metallic protrusions. Preferably, cut-off waveguides and/or cut-off structures are provided with dimensions which are frequency-dependent and prevent further propagation of the waves. These cut-off structures could for example be formed by a narrow slot. In a further preferred embodiment, absorber structures are present which offer a high absorption for the waves and reduce radiation. These absorber structures could adjoin the cut-off structures.

Preferably however, these protrusions do not protrude into the actual applicator device, or into the region in which the plastic preforms are actually heated. Advantageously however, the wall protrudes beyond said slots, and said protrusions are arranged in the regions which protrude beyond the slots.

Alternatively or additionally, other absorber devices and/or protective devices could be provided which are preferably not connected to the applicator device. In this embodiment, the narrower region of the housing is formed with structures of absorbent materials (which could for example be grid-like structures) which absorb the microwave radiation emerging from the channel of the applicator device.

The components of the housing are configured such that they reduce the microwave radiation to below the legally permitted limit range.

Preferably, the inlet and outlet slots of the housing are equipped with protrusions which reduce the microwave leakage to the above-mentioned, legally permitted value. The inlet and outlet regions of the housing are preferably equipped with a combination of protrusions and structures of absorbent or non-absorbent materials for reducing microwave leakage. Furthermore, preferably the channel of the applicator device is equipped with additional cut-off waveguides or cut-off structures for reducing the leakage of microwaves.

In a further advantageous embodiment, the apparatus has a tuning device (also referred to below as a tuner) which is suitable and intended amongst others for regulating a heating power for the plastic preforms. In order to set the resonance frequency of the applicator device to different fill levels with plastic preforms, and in particular to the frequency of the microwaves, tuning devices (tuners) are provided. These tuning devices may preferably be provided in a channel adjoining the applicator device.

In a preferred embodiment, the tuning device is suitable and intended for matching a resonance frequency of the applicator and an emission frequency of the microwave generator device to each other. Particularly preferably, this matching takes place by a change and/or adaptation of the resonance frequency. Thus, the tuning device preferably comprises means which are suitable and intended for achieving a change in resonance frequency.

The term "resonance frequency" in particular means the frequency with which the microwaves are applied to the plastic preforms, and/or the frequency which results with an applicator or resonator which is at least partially and preferably completely filled (with plastic preforms). Preferably, this resonance frequency can be tuned.

The emission frequency is the frequency with which the microwave generating device emits radiation. This emission frequency cannot be changed, or cannot be changed in controlled fashion, at least when a magnetron is used (but can however be changed by a power change). When a solid-state microwave source is used, the emission frequency may also be changeable.

Preferably, the adaptation or tuning takes place for filled or partially filled applicator devices. Partially filled applicator devices may occur in particular in start-up processes or evacuation processes in which either (shortly after operating start) new plastic preforms are supplied to the applicator device, or the applicator device is being emptied. The adaptation or tuning may be regulated and controlled depending on the load state of the applicator and/or physical values of the microwave field.

In general, the heating power depends on several influential factors, in particular the microwave power available, a screen setting, a coupling, a tuner setting, a material and a temperature of the plastic preform, and a transport speed.

Here, preferably different tuning concepts may be provided. Thus, for example slow tuning concepts may be provided, which are suitable for the complete frequency range and can supply partially filled and also completely filled applicator devices. Also, these tuning concepts may allow the heating of plastic preforms of low mass and also of plastic preforms of high mass. In this case, the tuning device may comprise a movable block of dielectric material which is preferably arranged at the rear end of the applicator (in the region of the last maximum of the standing wave pattern of the applicator device).

In addition, a fast tuning device concept may be provided which is provided for a limited frequency range in order to compensate for the rapidly changing divergence between the resonance frequency of the applicator device and the microwave source. This may be caused by a periodic change in resonance frequency of the applicator device when the plastic preforms move through the standing wave or standing wave pattern of the applicator device. In addition, this can be achieved by rapid changes of the centred frequency of the microwave source (in particular in the case of a solid-state source). Alternatively or additionally, a rotating structure of dielectric and/or metallic material may be provided, which is preferably arranged close to a maximum of the standing wave pattern of the applicator device.

Preferably, the tuning element or tuning device is made from a material selected from a group of materials containing $AL_2O_3$, PTFA, PTFE, quartz, PEI (polyetherimide), Igus A500® and similar. Preferably, thus an adaptable material short-circuit with a choke may be provided, which effectively limits the dimensions of the resonator or cavity or waveguide.

In a further preferred embodiment, at least one end of the applicator device is open in the transport direction. In a further preferred embodiment, both ends of the applicator device, i.e. both the end in the transport direction of the plastic preforms and the end against the transport direction of the plastic preforms are open.

In this way, the plastic preforms can be introduced into the applicator device easily and in particular without movement in their longitudinal direction. It would however also be possible that the plastic preforms are introduced into the applicator device such that they are inserted therein by a lifting movement or a lowering movement in a starting region of the applicator device, and are extracted therefrom again at another end of the applicator device. In this embodiment, there would be no need for two ends of the applicator device or for damping in this region, but a more complex mechanism would be required for introducing the plastic preforms into the applicator device.

In a further advantageous embodiment, the tuning device has at least one rotatable tuning element (or tuning structure). Particularly preferably, the tuning device has at least two rotatable tuning elements, wherein particularly preferably these tuning elements are rotatable about mutually parallel rotational axes.

Particularly preferably, these at least two tuning elements are arranged opposite each other relative to the transport path of the plastic preforms, and/or the transport path of the plastic preforms runs between said two tuning elements. Particularly preferably, the tuning elements are arranged symmetrically relative to the transport path of the plastic preforms.

In a further embodiment, more than two such tuning elements are provided. Particularly preferably, at least four, preferably at least six such tuning elements are provided.

In a further preferred embodiment, an even number of such tuning elements is provided. In a further advantageous embodiment, respective tuning elements lie opposite each other in pairs relative to the transport path of the plastic preforms.

In a further preferred embodiment, the individual tuning elements are rotatable independently of each other. It is however also possible and preferred that the rotations of two tuning elements, which lie opposite each other relative to the transport path of the plastic preforms, are coupled together with respect to their rotation, wherein this coupling can be achieved both mechanically and via the control system of the respective drive devices of the tuning devices. These drive devices may in particular be electric motor drive devices. Such a coupling may ensure that the tuning elements lying opposite each other relative to the transport path are always in a corresponding or also symmetrical rotational position.

In a further preferred embodiment, the at least one tuning element is rotatable relative to a rotational axis which runs parallel to a longitudinal direction of the plastic preforms to be heated.

In a further preferred embodiment, at least one tuning element and preferably several tuning elements, and preferably all tuning elements, are arranged in a region of the applicator device which is situated close to a maximum of the standing wave pattern of the applicator device. The phrase "situated close to a maximum" means that the distance between the tuning element and/or its geometric rotational axis on one side and the maximum on the other is less than the distance between the tuning element and/or its geometric rotational axis on one side and the minimum of the standing wave pattern on the other. Preferably, the distance from the maximum is less than half as great as the distance from the minimum, preferably less than one third as great, and preferably less than one quarter as great, and particularly preferably less than one fifth as great.

Preferably, the tuning elements or structures may be rotated differently or synchronously with respect to both a maximum and a side of the applicator device. Particular preference is given to an embodiment in which the symmetry relative to the axis in the transport direction of the transport path is retained.

In a further preferred embodiment, the tuning elements are made from a dielectric and/or metallic material.

In a further preferred embodiment, the tuning elements have a cross-section in the form of a circle segment, in particular a semicircular cross-section.

In a further preferred embodiment, the at least one tuning element and preferably several tuning elements are integrated in a wall. The wall may have recesses in which the tuning elements are installed. These walls may thus have gaps in which the rotational axes of the tuning elements are situated.

It would thus be conceivable that the tuning elements have a semicircular cross-section, and depending on rotational position are retracted to a greater or lesser extent into the wall. Thus, in one rotational position, the semicircular cross-section could protrude completely out of the wall, and in a further rotational position be completely retracted into the wall.

Preferably, the tuning elements can be rotated through a rotational angle which is greater than 90°, preferably greater than 180°, preferably greater than 210°, preferably greater than 240°, preferably greater than 270°, and particularly preferably greater than 300°.

Preferably, the tuning elements can be rotated through a rotational angle which is less than 370°, preferably less than 360°, preferably less than 350°, preferably less than 340°, preferably less than 330°, and particularly preferably less than 320°.

In a further preferred embodiment, the wall also consists of a dielectric and/or a metallic material. In a preferred embodiment, said wall is also arranged inside the applicator device.

In a further preferred embodiment, said wall extends in the transport direction of the plastic preforms. In a further preferred embodiment, the wall extends in the longitudinal direction of the plastic preforms.

In a further preferred embodiment, at least one tuning element is provided which is movable in its longitudinal direction relative to the applicator device. Thus, the at least one tuning element, and preferably the several tuning elements, may preferably be retracted into an opening and/or extended out of the applicator device.

The shift or retraction of these tuning elements takes place as in the case of the 3-stub tuner.

Preferably, several such tuning elements are provided as described above, wherein these again may be arranged symmetrically relative to the transport path and may also be configured as described above for the rotatable tuning elements. It is also possible that these tuning elements are situated in the vicinity of the maxima of the electrical field.

It would also be possible that the tuning elements are both rotatable and movable in their longitudinal direction.

In a further preferred embodiment, the applicator device is suitable and intended for applying to the plastic preforms a temperature profile which changes in their longitudinal direction. Thus, it would be possible that some regions of the plastic preforms are heated more greatly than other regions, for example a base region is heated more greatly than a central region of the plastic preforms. Such an embodiment may be advantageous in particular for a later moulding process using a stretch blow-moulding machine.

In a further advantageous embodiment, the applicator device comprises metallic and/or dielectric elements, wherein preferably these metallic and/or dielectric elements can be exchanged and/or at least a position of these elements can be changed. These metallic and/or dielectric elements serve in particular to cause a targeted field change, in order to apply a field to the plastic preforms which changes in their longitudinal direction, and thus to heat the plastic preforms differently in the longitudinal direction.

In a further preferred embodiment, these elements are movable, in particular displaceable and/or rotatable. Preferably, the apparatus comprises at least one drive device for moving these elements. In particular, this is an electric motor drive. Furthermore, it is conceivable that these elements are exchangeable so as to ensure adaptability of the applicator device.

In a further advantageous embodiment, a position and/or situation of the metallic and/or dielectric elements can be changed in controlled fashion. Thus, it is conceivable that a regulation and for control system of the applicator device is provided which, for example in response to a desired temperature profile of the plastic preforms, changes the position and/or situation of the metallic and/or dielectric elements, and in particular actuates the above-mentioned drive which moves these elements. This control system could be integrated in an overall control system of the plant.

In a further advantageous embodiment, the apparatus has at least one first sensor device which detects a temperature of the plastic preforms. Particularly preferably, the sensor device is suitable and intended for detecting the warming or temperature of the plastic preforms in contactless fashion. Particularly preferably, the sensor device is suitable and intended for detecting the temperature of the plastic preforms during their movement. Particularly preferably, the sensor device is a so-called pyrometer.

In a further advantageous embodiment, the apparatus comprises at least one second sensor device which detects a temperature of the plastic preforms. Advantageously, the first temperature measuring device and the second temperature measuring device are arranged at different positions along the movement path of the plastic preforms. In this way, a temperature gradient or warming of the plastic preforms can also be determined. As stated above, these data may be used for control and/or regulation of the apparatus.

In a particularly preferred embodiment, the apparatus comprises a control device which allows control and in particular regulation of the heating device, and in particular real-time regulation. More precisely, the power of the heating devices or applicator device may also be matched precisely to the rotation, movement and temperature of the plastic preforms.

In a preferred embodiment, the apparatus comprises at least one, preferably two or more, for example three microwave applicator devices. It is conceivable that the temperature is measured using a pyrometer or an infrared camera, for example at the inlet, in an applicator device, between the applicator devices or after the applicator devices.

Since the dielectric loss factor is temperature-dependent, it is advantageous if the temperature of the plastic preforms lies within a limited temperature range before processing with the microwave heating device. This can take place for example by pre-tempering both with microwaves but also with warm air, infrared radiation or laser. Thus, for example the plastic preforms may be pre-tempered in a first heating stage and brought to the same temperature. Subsequent tempering would also be possible, i.e. tempering after the tempering described here with microwaves. Also, simultaneous and/or combined tempering would be possible.

For this, it is possible for example that the temperature of the plastic preforms is measured before the first applicator using a first sensor device, such as for example a first pyrometer, then the power and/or duration of stay of the plastic preforms in this first applicator is adapted such that after the first applicator device, an evenly tempered flow of plastic preforms results. This may in some cases be checked with a second sensor device. In the following applicator devices, the desired residual temperature profile can then be applied. A control system may be provided which is arranged both centrally and decentrally, and controls and preferably regulates the plant.

Preferably, the apparatus comprises a further sensor device which determines a temperature of the plastic preforms. It is possible that after the plastic preforms have left the final tempering device (infrared oven, microwave oven, laser, hot air, cooling air or tempering plates), the temperature profile is measured again and then the container is stretch blow-moulded. Then the blown container can be tested again, for example with respect to the distribution of wall thickness.

In a preferred embodiment therefore, the apparatus also comprises a blow-moulding device arranged downstream of the heating device, such as in particular a stretch blow-moulding machine. Furthermore, the apparatus preferably also comprises a testing device which is suitable and intended for testing the finished blown containers, in particular with respect to the distribution of wall thickness.

It is possible that all data, such as in particular an inlet temperature, an intermediate temperature, tuning settings, outgoing and return power, position of the tempering elements, frequency, outlet temperature, heater variables, additional cooling, blow curve recording, stretching force and also the data from a monitoring device at the outlet, in particular for the wall thickness, are recorded in one or more IPCs and used for self-regulation of the process. Thus, it is possible that, on a deviation from the target wall thickness in a specific region, a tempering element in an applicator device must be adjusted in order to achieve the desired wall thickness profile again. In particular however, the final temperature before the stretch blow-moulding process may be used as an important controlled variable, since here the pure heating process is monitored and only its effects on the final container quality.

In a further advantageous embodiment, the apparatus comprises a sensor device which is suitable and intended for detecting emerging microwaves. In particular, microwaves are detected which (undesirably) emerge from the applicator device.

In principle, the applicator device is configured such that no critical microwave leakage occurs. If nonetheless this does occur, it is advantageous for example to build a metallic, conductive, protective housing around the system. With such a leakage measuring device, it can now be measured whether microwave energy is present within the protective device. If this exceeds a predefined limit value, the microwave power is switched off. It is however also conceivable also to fit a second measuring device for measuring leakage outside the protective device. This can monitor a legal limit value and switch off the system if a preset threshold value is exceeded. Advantageously therefore, the apparatus comprises a first leakage measuring device and a second leakage measuring device.

In a further advantageous embodiment, the apparatus comprises a sensor device which detects interference, and in particular plasma arcs.

Since PET has a low dielectric loss factor, a high field density is required in the applicator device. This in turn may lead to plasma ignition and microwave leakage. In order not to cause damage to the applicator device on plasma ignition, it is therefore proposed to provide a detector or sensor device (in particular but not exclusively a photodiode) which looks into the applicator device or resonator in order to detect possible plasma ignitions immediately.

In this case, a control device may cause the microwave power supply to be switched off. Preferably, such a control device reacts within 100 µs, preferably within 10 µs. It is possible that such a sensor device is assigned to each applicator device. It would however also be possible for several applicator devices to be protected by means of one sensor device.

It would also be possible for the energy supply to be reduced or switched off briefly in order where applicable to allow filaments or impurities to be burned at the injection point, so no more plasma is present when it is switched on again. Also, plastic preforms could be ejected.

In a further advantageous embodiment, the apparatus comprises a sensor device which detects the geometric form of the plastic preforms, and in particular but not exclusively a preform length or a preform diameter. It could also be detected whether a plastic preform is present. In a microwave heating device, it is advantageous to place function elements in the resonator close to the base dome of the plastic preforms. Therefore it may be disadvantageous for the system if the plastic preforms are too long. Therefore in the context of this embodiment, it is proposed to connect an inspection device upstream of the actual heating device. This may for example detect physical properties such as length, thickness, dielectric properties, contamination, faulty plastic preforms, filaments at the injection point, deformed mouthpieces, oblique seating in the holding devices, and similar.

Particularly preferably, furthermore an ejection device may be provided which ejects the plastic preforms concerned before entry into the applicator device. Such an inspection system may for example be a light barrier, a camera, an inductive or capacitative measuring device, or a small measuring resonator, or may contain one or more of these elements.

A light barrier or a mechanical scanner looking below the stream of plastic preforms may also be present while the plastic preform is in the heating device. This may detect a slipping of a holding device and for example stop the machine.

In a further advantageous embodiment, the apparatus comprises a cooling device, in particular for cooling the microwave generator and/or applicator device. Preferably, liquid cooling may be provided here. In a preferred embodiment, the apparatus comprises a sensor device and in particular a flow monitor which monitors this cooling.

Thus for example, it is possible for disconnection to take place if the temperature of an applicator device or a microwave generator device exceeds a predefined limit value.

In a further advantageous embodiment, the apparatus comprises a cooling device for cooling a mouth region of the plastic preform. For example, air cooling may be provided which blows cool air onto the mouth region of the plastic preform. However, another region of the plastic preform may also be cooled.

In a further advantageous embodiment, the applicator device is configured such that it allows a temperature profile in the longitudinal direction of the plastic preforms, i.e. different temperature regions to be applied in different longitudinal regions of the plastic preforms. This may be possible in particular by modification of the electrical field inside the applicator device. This may be achieved for example by fixed or adjustable dielectric and/or metallic function elements situated in the applicator. Such function elements may preferably be exchanged in the manner of fittings. Adjustment can take place by motor and preferably be actuated by a control system in order to achieve a desired temperature profile.

With regard to the machine layout, it would also be possible to configure the present heating device as a carousel, and in this case provide an applicator device with a circular profile.

In a further advantageous embodiment, inside the applicator device the apparatus has function elements which are preferably movable and allow adaptation of a microwave field inside the applicator device. As stated above, in this way adaptation can be made to the different plastic preforms known from the prior art.

Preferably, the apparatus comprises several function elements which particularly preferably are movable and/or adjustable independently of each other. Particularly preferably, the function elements are movable in a direction which stands perpendicularly to the transport path of the plastic preforms or has at least one component which stands perpendicularly to the transport path of the plastic preforms.

Preferably, the apparatus has at least two such function elements which are arranged symmetrically relative to the transport path of the plastic preforms.

In a preferred embodiment, the at least one function element and preferably at least two function elements are adjustable and/or movable such that a symmetry relative to an axis in the transport direction of the transport path of the plastic preforms is retained. Preferably, these function elements are also moved accordingly in the method.

These function elements may be configured as plate-like bodies arranged inside the applicator device. It would also be possible for the function elements to be configured as strips. Preferably, a longitudinal direction of these function elements extends along the transport path of the plastic preforms and/or perpendicularly to a longitudinal axis of the plastic preforms.

In a further advantageous embodiment, the function elements consist of at least one and preferably various metallic and/or dielectric materials.

In a further preferred embodiment, the at least one function element and preferably several function elements are arranged on rod-like carriers. Preferably therefore, the at least one function element is held in a position spaced away from a wall of the applicator device.

In a further preferred embodiment, at least one function element is arranged adjacent to a dome or end portion, and in particular a closed end portion of the plastic preforms. In a particularly preferred embodiment, at least one function element is arranged below said dome of the plastic preforms, and in particular directly below this dome. Preferably, this function element is movable and/or adjustable in a vertical direction.

In a further advantageous embodiment, the heating device may have different shapes of waveguides. Thus for example rectangular waveguides may be provided, or round waveguides, elliptical waveguides, hexagonal waveguides, ridge waveguides and similar.

In a further advantageous embodiment, additional protective elements are provided at a region of the slot through which microwaves could emerge. Thus for example, $\lambda/4$ traps could be provided in these regions. Also, brushes with metallic bristles may be provided which attenuate the microwave power emerging from the applicator device.

In a further advantageous embodiment, the heating device also comprises an infrared heating module. This infrared heating module may in particular serve for pre-tempering the plastic preforms.

Furthermore, the apparatus comprises at least one and preferably a plurality of transport devices which are suitable and intended for transporting plastic preforms to the applicator device. For example, these may be so-called pitch delay stars which are suitable and intended for changing a pitch of the plastic preforms during their transport.

Here, in some cases, modern transport variants or those known from the prior art may be used, which are also already used as standard in the infrared process. These transport variants may also be configured with modifications, also with the linear microwave heating unit described here. It would even be possible for a heating device to supply several successive moulding machines, for example blow-moulding machines. Such plants could also comprise machine parts such as for example sterilisation devices. As stated above, preferably the applicator device is arranged stationarily and the plastic preforms move relative to the applicator device.

It would however also be conceivable for the plastic preforms to be stationary and the applicator device to move, in particular to move relative to the plastic preforms. In particular however, the applicator device and the plastic preforms move relative to each other. This movement takes place in particular a direction standing perpendicularly to the longitudinal direction of the plastic preforms.

Advantageously, a heating process of the heating devices described here for plastic preforms is suitable, in which hot or cold filing product is either filled directly into the plastic preform for moulding of the container, or the container is later filled with hot medium and then cooled again. In such an embodiment, a microwave heating unit may be situated before an intermediate module and before a moulding process, in particular a blow-moulding machine. In the context of a so-called hot fill process, as a particular feature, higher requirements also apply with regard to preform temperatures and also an increase in the crystalline proportion of the PET material during heating.

Furthermore, it is also conceivable that an aseptic blow-moulding machine with or without isolator adjoins the heating device. For example an intermediate module may be provided which for example is a dry aseptic module, a wet aseptic module, a radiation device which bombards the plastic preforms with electromagnetic radiation, or similar. It is possible that the heating device described here and/or an intermediate module or a blow-moulding machine is sealed bacterially gas-tight, fluid-tight and similar by a bulkhead.

It would also be possible for the heating device itself to be configured as a sterile region and for corresponding precautions to be taken. For example, a filter or cleaning system is provided. In addition, in this region a separation may take place between a wet and a dry part of a sterilisation device.

Also, it is conceivable that a sterilisation agent such as liquid $H_2O_2$ is introduced into the preform upstream of the heating device and then activated in the heating device by means of microwaves.

As a transport device, various transport devices may be considered. Thus as stated above, as well as transport chains, also for example shuttles or movers operated as linear motors could be provided. Also a conveyor belt could be provided.

The transport speed of the plastic preforms inside the applicator device may be inconstant but also constant. An inconstant speed would have the advantage that regions in the applicator device or resonator, in which the electrical field of the resonator is minimal, can be passed more quickly than regions with a maximum. In this way, the plastic preform can be heated more rapidly. Alternatively however, it is also possible to have a constant speed with which the plastic preform is moved through the applicator device.

Thus, a design could be used which is approximately known, in which several plastic preforms are placed in the resonator at fixed spacings (for example via a belt or chain) and rotated relative to the preform longitudinal axis via mechanical-pneumatic or mechanical-electronic components, such as for example a chain drive, a servo drive or similar. Alternative transport possibilities, as stated above, could be movers which move on a magnetic track or similar independently of each other and thus carry out uneven or even movements in the applicator device.

An uneven movement has the advantage that for example minima of an electrical field can be passed more quickly and hence, overall, the heating duration can be reduced. Furthermore however, several plastic preforms could be placed in the applicator device with a fixed spacing and moved accordingly.

The rotation of the plastic preforms may be achieved for example via a central chain drive or toothed belt or similar (for example servo drives, electromechanical drives, pneumatic drives and/or mechanical drives). It would be possible here for the individual plastic preforms to be rotated with uniform rotational speeds, wherein these rotational speeds could however preferably also be changed. This can be achieved by corresponding movements of a toothed belt. This toothed belt may for example drive gear wheels arranged on the respective holding devices and coupled to a gripper device so that the plastic preforms are rotated.

In addition, a gripper could also be used on a curved disc in order to achieve direct transport in the heating module. By intelligent kinematics of the system, in this way an even or alternatively uneven movement could thus be carried out inside the applicator device.

As stated above, the plastic preforms may be delivered to the applicator device from above, from the side or theoretically also from underneath. As stated above, these open sides should be shielded to protect against the emergence of radiation. In a further advantageous embodiment, the apparatus comprises a turning device which is suitable and intended for reversing an orientation of the plastic preforms. Thus for example the plastic preforms could be turned such that they are transported through the applicator device with their mouths pointing downward. This would have the advantage that cooling of the mouth regions of the plastic preforms can be achieved more easily.

The transport devices out of or into the applicator device or heating device could be configured similarly to the prior art with pitch delay stars or saw-tooth stars, or the preforms could also be delivered to the downstream processing steps or taken from an upstream feeder apparatus by means of mover belts or other transport systems. The advantage of belts or movers may be the more variable process. Thus, for example, the transport device could comprise a corresponding rail system with a heating apparatus, several moulding machines and similar, and by means of this a movement device such as a mover and corresponding branches could be supplied. This could for example also be achieved with delay stars or belts or air transporters or similar.

As stated above, targeted cooling of certain regions of the plastic preforms during transport is also advantageous. During or after the heating phase, or also during a transfer phase following the heating phase, a local reduction in temperature could be achieved, for example by a nozzle device such as for example a Vortec nozzle. Also a surface cooling could be carried out, in that a region of the plastic preform is contacted by cooling element. It may also be advantageous if cooling is carried out simultaneously during the heating phase, in order to protect certain regions of the plastic preforms from overheating or to achieve a specific temperature profiling. It could also possible to cool the plastic preform to a specific definable temperature by cooling, and construct the cooling system as a control loop. Here, a correcting variable with which a fan or similar is operated may also be a controlled variable by means of which the temperature of the plastic preforms is set.

In a further advantageous embodiment, the apparatus comprises an ejection device for rejecting faulty plastic preforms. These may be defective for example because of their material or geometry or also processing errors. In the case of a defective temperature profile or other defect in the plastic preforms, it should be possible to eject this plastic preform, in particular individually, from a moulding wheel or other processing station or transport device. This may be achieved by actuators which push the plastic preform out of the process. These could for example be operated mechanically, electrically, pneumatically, hydraulically or electromechanically. Detection of a defect or faulty transport profile may take place preferably in advance, in particular contactlessly.

The present invention is furthermore directed at a method for heating plastic preforms, wherein the plastic preforms are transported along a predefined transport path by a transport device. Here, the transport device comprises holding devices for holding the plastic preforms, and this transport path has at least one heating portion inside which the plastic preforms are heated. Furthermore, at least one heating device is arranged, in particular stationarily, at least in portions along the transport path and heats the plastic preforms transported by the transport device during their transport through the heating portion. The heating device has at least one in particular stationary applicator device which bombards the plastic preforms with microwaves in order to heat them.

According to the invention, at least in the heating portion, the transport device is arranged relative to the applicator device such that at least parts of the holding elements are arranged outside the applicator device. According to the method therefore, it is also proposed that at least part of the heating device does not run inside or through the applicator device.

In a further method according to the invention, plastic preforms are also transported along a predefined transport path by a transport device, wherein the transport device comprises holding elements for holding the plastic preforms and wherein this transport path has at least one heating portion inside which the plastic preforms are heated. Furthermore, a heating device is provided which is arranged, in particular stationarily, at least in portions along the transport path and heats the plastic preforms transported by the transport device during their transport through the heating portion. The heating device has an in particular stationary applicator device which bombards the plastic preforms with microwaves in order to heat them. According to the invention, for at least part of the time the plastic preforms are rotated relative to their longitudinal direction, in particular during heating. Advantageously, the plastic preforms are for at least part of the time both transported and also rotated relative to their longitudinal direction.

In particular, the microwaves are coupled into the applicator device. It would in principle also be conceivable for the microwaves to be generated in the applicator device, but here however it is proposed that the microwaves are generated outside the applicator device and coupled into the applicator device. The microwaves are coupled in via a hollow waveguide in particular.

As stated above, the heating device described here may be arranged upstream of an apparatus for moulding plastic preforms into plastic containers and in particular plastic bottles.

The apparatus for moulding plastic preforms into plastic containers is preferably a blow-moulding machine. This means that the plastic preforms are first thermally conditioned in a heating section and then expanded by bombardment with a liquid or gaseous medium. The fluid medium is preferably pressurised. For the supply of the pressurised medium, the apparatus comprises a blow nozzle which can be placed tightly on a mouth of the plastic preform in order to expand the plastic preform with the liquid or gaseous medium. Preferably, a valve arrangement is also provided which controls the supply of blowing air to the plastic preforms.

Preferably, the blow-moulding machine is a stretch blow-moulding machine, which means that the preforms are stretched in the longitudinal direction by means of a stretching rod before and/or during expansion. The blowing stations each have stretching rods which can be inserted in the plastic preforms and stretch the plastic preforms in the longitudinal direction. The stretching rods preferably have an electric drive.

In an advantageous embodiment, a plurality of blowing stations is arranged on a common movable carrier. This carrier is in particular a rotatable carrier. The blowing stations each have a blow-moulding device which preferably forms a cavity, inside which the plastic preforms can be expanded into plastic containers. These blow-moulding devices are preferably configured in multiple pieces and have two blow-mould halves and a base mould. Preferably, these blow-mould halves are releasably attached to a mould carder shell or blow-mould carrier. The blow-mould carriers are pivotable relative to each other in order to open and close the blow-moulding devices. The blow-mould carrier also comprises locking mechanisms for locking the mould halves together during the blowing process.

Particularly preferably, the blow-moulding machine or the carder and the blow-moulding devices are arranged inside a clean room which isolates the blow-moulding machine from a non-sterile environment. Drive devices for closing, locking and/or opening of the blow-moulds are preferably arranged outside the clean room.

The blow-moulding devices are preferably transported inside the clean room. The clean room is preferably delimited by several walls. Preferably, the clean room is delimited by at least one stationary wall and a wall which is movable relative to the stationary wall. The clean room isolates the blow moulds in particular from a non-sterile environment. Advantageously, the clean room is configured in the manner of a ring or torus around the blow-moulding stations or moulding stations and/or the transport path of the plastic containers.

Further advantages and embodiments arise from the attached drawings.

BRIEF DESCRIPTION OF THE DRAWINGS

The drawings show:

FIGS. 5a-5d four representations of an applicator device;

FIG. 6a-6c three representations of a tuning device;

FIG. 11a-11f six representations of holding devices for plastic preforms;

FIG. 12*a*-12*d* four representations of the function method of a function element;

DETAILED DESCRIPTION OF THE INVENTION

Figure 1A:
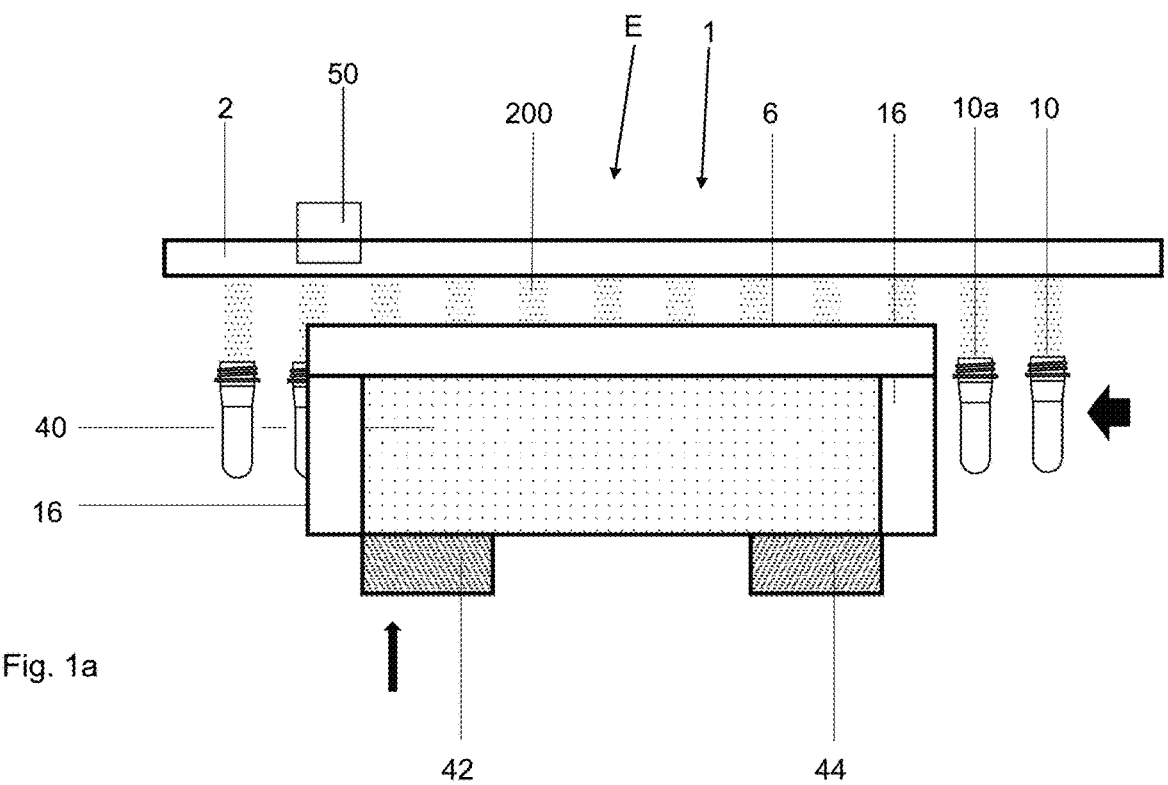
FIG. 1a, b two representations of an apparatus according to the invention.

FIG. 1*a* shows a schematic representation of an apparatus 1 according to the invention for heating plastic preforms 10. This apparatus 1 has a transport device 2 on which a plurality of holding devices 200 is arranged. These holding devices can here be moved along the arrow.

The transport device may preferably comprise a circulating carrier on which the individual holding elements are movably arranged. The holding devices each have internal grippers, described below in more detail, which each engage in the mouths 10*a* of the plastic preforms 10.

Reference sign 40 schematically indicates an applicator device through which the plastic preforms are transported and in which the plastic preforms are bombarded with microwaves. To this end, microwaves are generated and, as indicated by the small vertical arrow, coupled into the applicator device 40. Tuning elements, described below in more detail, may be present in the region of a waveguide outlet. Reference sign E here indicates a heating region inside which the plastic preforms 10 are heated. This heating region here extends along the applicator device in the transport direction of the plastic preforms.

Reference sign 6 indicates a first damping device which serves to damp or attenuate microwaves emerging from the applicator.

Reference sign 16 refers to further damping devices which may be provided on the end faces of the applicator device, i.e. at the points at which the plastic preforms enter and leave the applicator device.

An apparatus 1 according to the invention may comprise a plurality of applicator devices arranged successively in the transport direction of the plastic preforms. As stated above, the applicator devices may follow both a straight course and a curved course.

Reference sign 50 roughly schematically indicates a rotation device which causes a rotation of the individual holding devices 200 and also the plastic preforms 10 arranged thereon. As stated above, this rotation device may comprise a toothed belt (not shown) on which corresponding gear wheels of the holding device run, so as to cause a rotation of the holding devices.

Figure 1B:
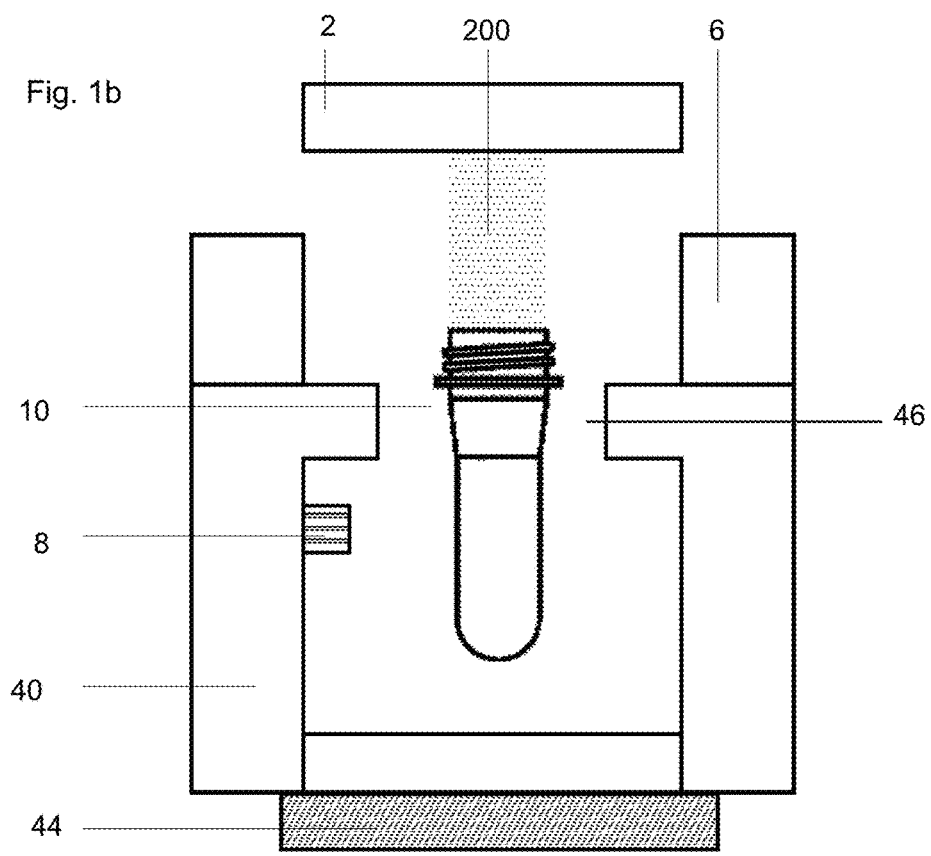

FIG. 1*b* shows a view of the apparatus in the transport direction of the plastic preforms. Here too the holding device 200 on which the plastic preform 10 is arranged is also shown. Reference sign 46 identifies a gap, within which the plastic preform is transported through the applicator device 40. Reference sign 8 indicates a function element, described in more detail below, which adapts the field distribution inside the applicator device. Reference sign 44 again indicates the tuning device which serves for tuning the wavelengths, as described in more detail below.

Figure 2A:
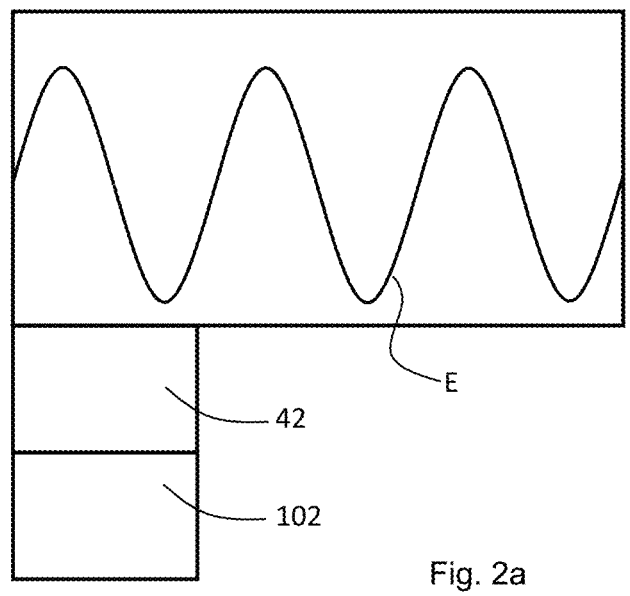
FIG. 2a, b two representations to illustrate applicator principles.
Figure 2B:
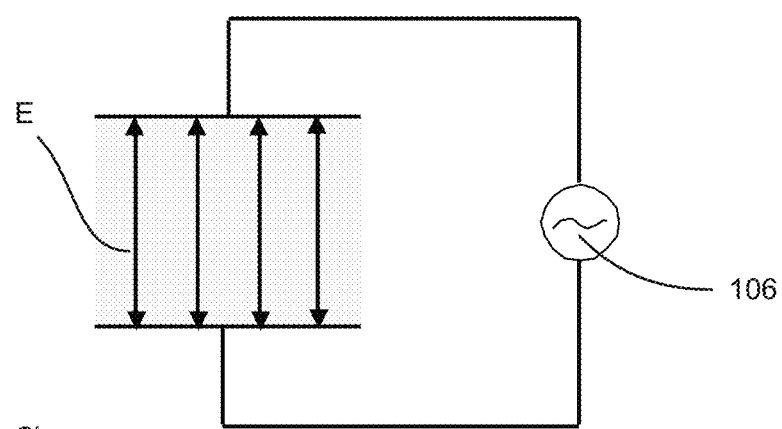

FIGS. 2*a* and 2*b* show two basic principles in the bombardment of plastic preforms with microwaves. In the situation shown in FIG. 2*a*, microwaves are coupled into the applicator device from a microwave source 102 and here a coupling device 42. In the situation shown in FIG. 2*b*, the microwaves are generated in the applicator starting from an alternating current source 106. In the context of the invention, reference is made in particular to the principle shown in FIG. 2*a*, in which the microwaves are coupled into the applicator device.

Figure 3A:
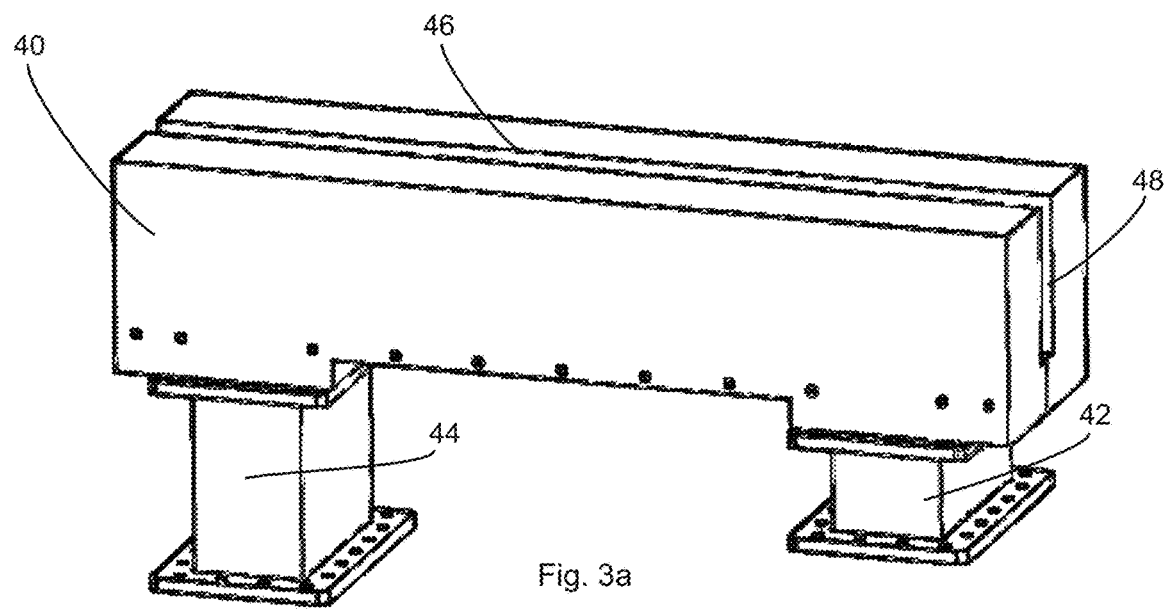
FIG. 3a, b two representations of an applicator device.
Figure 3B:
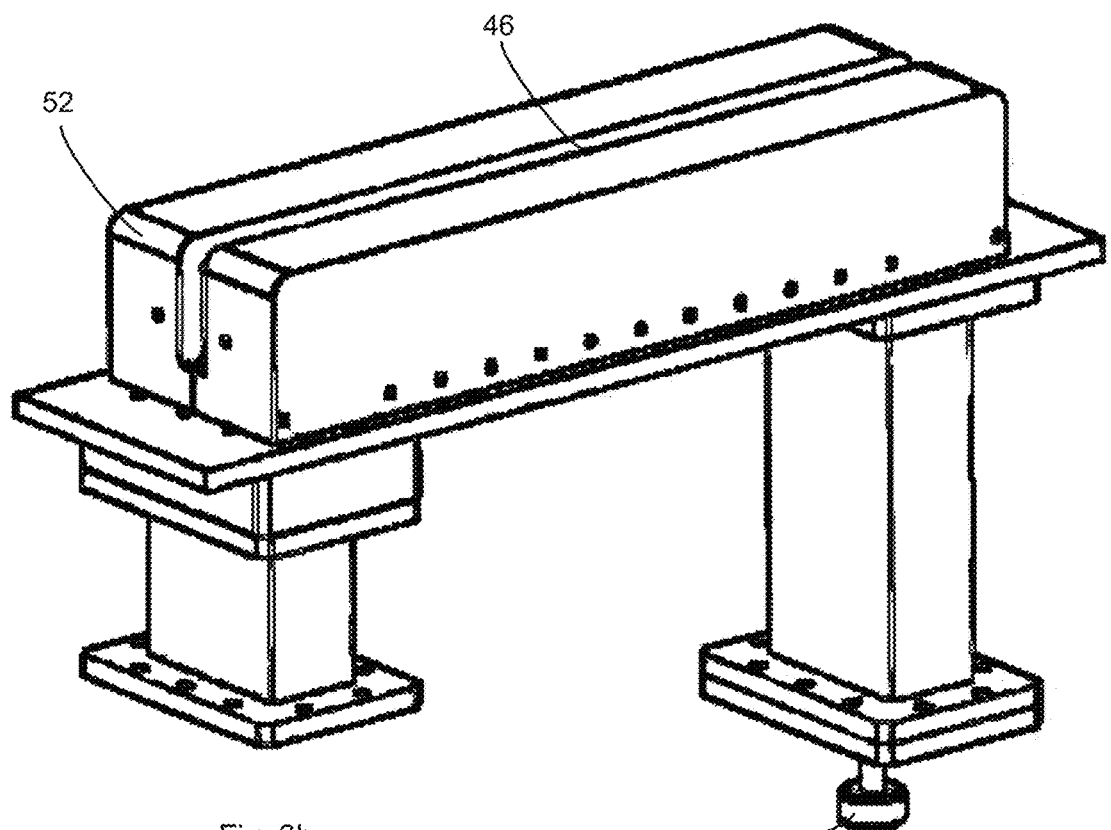

FIGS. 3*a* and 3*b* show two embodiments of an applicator device 40. Here again, the gap 46 can be seen through which the plastic preforms are guided. Reference sign 48 indicates an inlet gap via which the plastic preforms enter the applicator and/or resonator. Reference sign 42 indicates a supply device such as a waveguide, via which the microwaves are coupled into the applicator device 40. Reference sign 44 indicates a decoupling or outlet device, in the region of which the microwaves are coupled out of the application region of the applicator device. In this region, tuning devices may also be provided, such as for example the tuning pins or tuning plates described in more detail below.

FIG. 3*b* shows a further embodiment of the applicator device 40. Here, a design is shown which has no sharp edges so as to reduce the risk of arc formation.

Figure 4A:
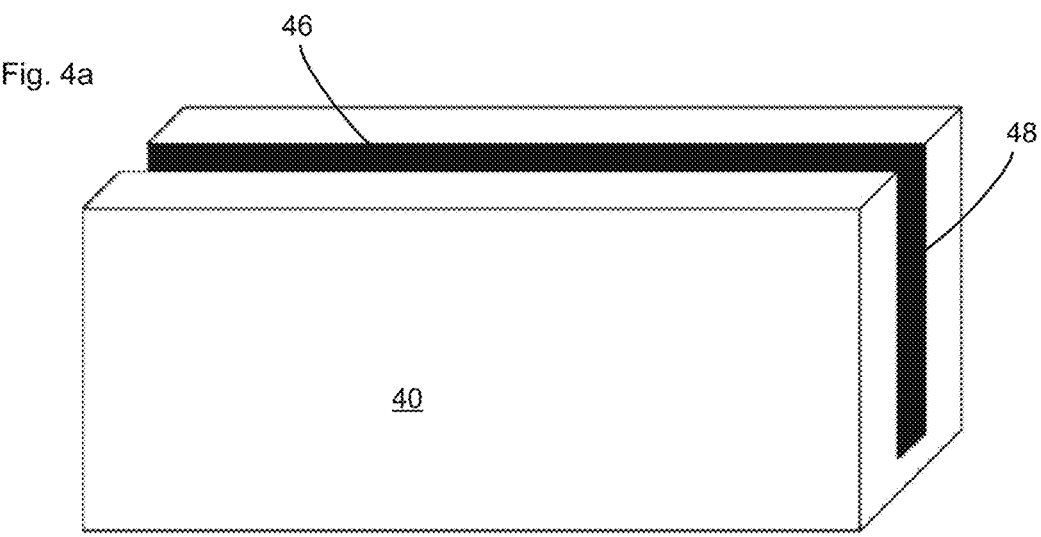
FIGS. 4a-4c three representations of an applicator device.
Figure 4B:
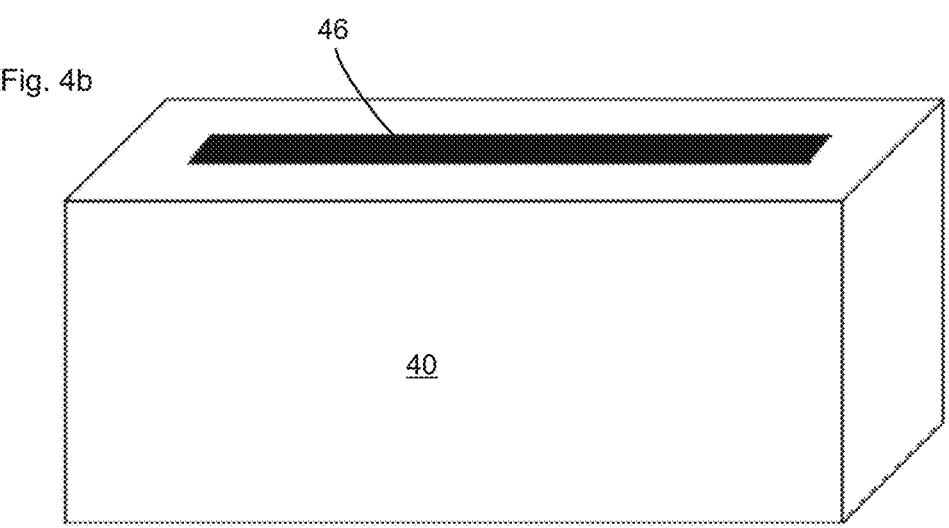
Figure 4C:
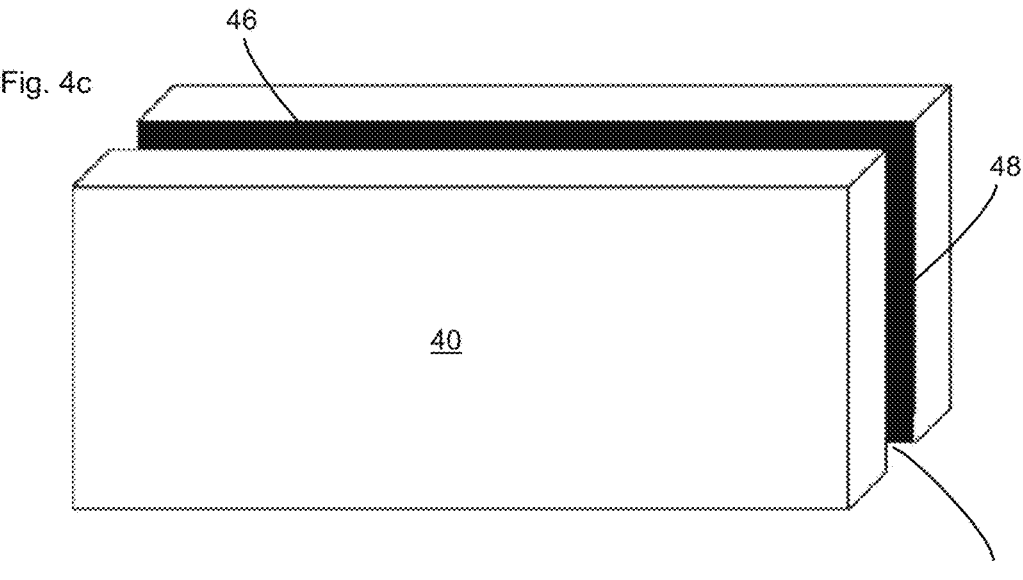

FIGS. 4*a* to 4*c* show three embodiments of the applicator devices. It is possible that the applicator device shown in FIG. 4*a* is open on three sides. The plastic preforms can be introduced via a gap 48 and discharged again on the other side. Furthermore, the applicator device may also be configured as shown in FIG. 4*b*, i.e. having only one gap 46. In this case, the plastic preforms are inserted into this gap in order to be heated inside the applicator device. In the embodiment shown in FIG. 4*c*, a gap 49 is also provided on the underside, which means that this applicator device is open on all sides.

FIGS. 5*a* to 5*d* show four embodiments of applicator devices. In each case, again the supply device 42 or coupling waveguide 42 is provided, and also a decoupling waveguide. Reference sign 60 roughly schematically indicates a tuning device arranged inside the outlet waveguide 44. This tuning device can here be moved in a vertical direction in order to tune a wavelength and/or an intensity of the microwaves inside the applicator device 40. Reference signs 52 and 54 identify two deflecting regions in which the microwaves are deflected into the applicator device 40. It is evident that a deflection through 90° takes place here. The difference between the variants shown in FIGS. 5*a* and 5*b* is that in the variant shown in FIG. 5*a*, a polygonal transition is provided, whereas in the embodiment shown in FIG. 5*b*, the corner regions are rounded.

A screen (not shown) may be provided in the supply device 42 or coupling device 42 in order to couple microwaves into the applicator device 40 under corresponding control.

FIGS. 5*c* and 5*d* show two different procedures for coupling microwaves into the applicator device 40. Reference sign 10 again indicates the transported plastic preforms. In the variant shown in FIG. 5*d*, the microwaves are coupled in starting from the bottom of the applicator device 40. The material channel is arranged on the top of the applicator device. In the variant shown in FIG. 5*c*, the microwaves are coupled into the applicator device from the left or right side. In both variants, again a tuning device 60 may be provided. In addition, a protective window 62 may be provided.

FIGS. 6*a* to 6*c* show three examples of a tuning device 60. In the variant shown in FIG. 6*a*, a dielectric block 68 is provided inside the tuning device, i.e. inside the waveguide. This is movable in direction d and has a thickness w.

In the variant shown in FIG. 6*b*, a rotatable dielectric and/or metallic material 70 is provided in a region of the tuning element 60. Depending on the rotational position of the material, the wave paths inside the waveguide can be adapted. In the variant shown in FIG. 6c, a short-circuit element 72 is arranged inside the waveguide. This too is displaceable in its movement and can change the effective length of the cavity or also the resonator.

FIGS. 7a, 7b, 7c, 7d and 7e explain the wave generation inside the applicator or resonator. In the situation shown in FIG. 7a, a wandering wave is shown. If there are no limit conditions, for example from reflection of the wave, which lead to a standing wave pattern, the waveguide allows the wave to wander in a specific direction. Here, the field changes over time and the positions of the maxima and minima are not fixed. Power is coupled into the waveguide and can be partly absorbed by elements inside the waveguide, wherein the residual energy is preferably fed into a load situated at the end, such as for example a water load.

As shown in FIG. 1b, in this embodiment there are no fixed positions of maxima and minima. This procedure offers the advantage of a homogenous heating because the maxima wander through the applicator device. An energy transfer is possible here in all positions. Power leaving the applicator device can be attenuated or damped. An applicator of this type can also be operated empty or without products to be heated.

As stated, in the context of the invention, particular reference is made to microwaves, i.e. microwaves which are coupled into the applicator but generated outside the applicator. In the embodiment shown in FIG. 7c, a standing wave forms i.e. there are fixed positions of maxima and minima. This procedure allows better control of the field distribution inside the applicator device. Higher field intensities and hence a higher absorption of the microwave energy by substrates with a low absorption coefficient can be achieved with a resonator. The power is reflected inside the applicator device. This embodiment however uses or requires a load, such as for example the plastic preforms to be heated.

It would preferably also be possible to use combinations of the methods shown here, i.e. a combination of an applicator device with a wandering wave (in particular for preheating up to a certain uniform temperature), and a resonator, in order to achieve a profiling.

Figure 7A:
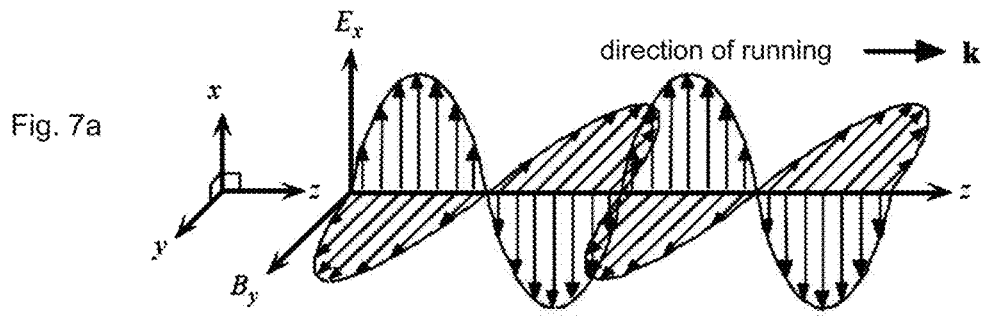
FIGS. 7a-7e five representations of field distributions in the applicator device.
Figure 7B:
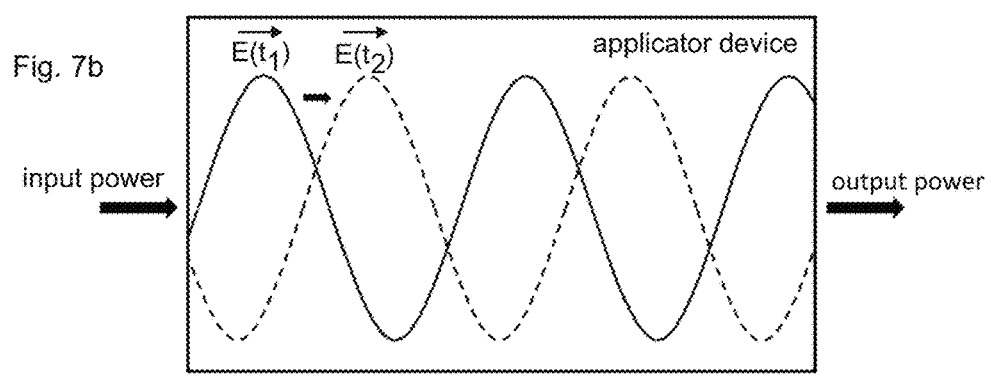
Figure 7C:
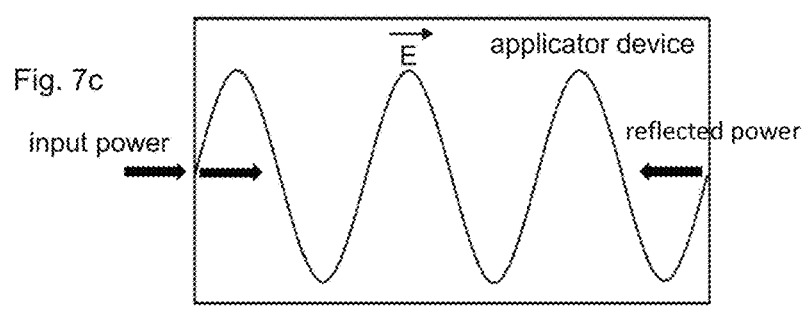
Figure 7D:
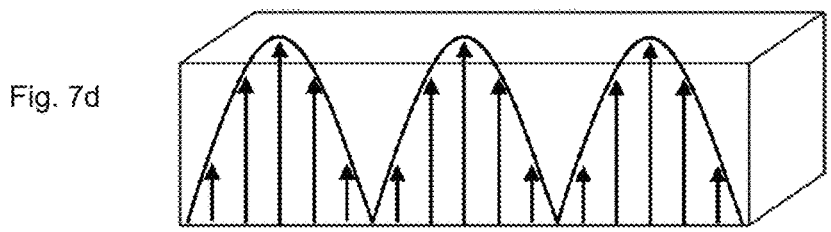
Figure 7E:
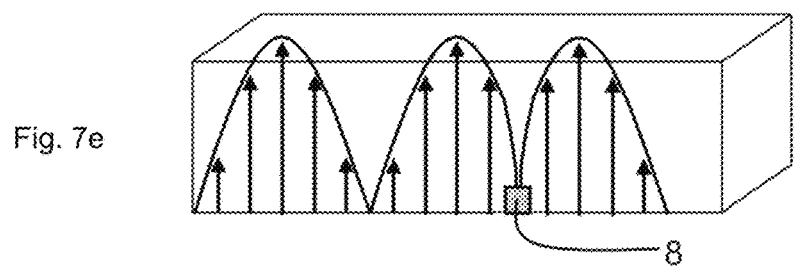

FIGS. 7d and 7e describe how the heating length of the applicator device can be reduced. For a resonant TE10n applicator, the heating of the plastic preforms in the region in which minima of the standing wave occur (minor region) is too low. In order to improve the heating efficiency of the applicator, a dielectric material (see FIG. 7e) may be introduced into the applicator device (such as for example quartz, PTFA or similar). This material is in particular placed in the regions in which low heating occurs. This improves the ratio between the regions of high heating and the regions of low heating, and as a direct consequence the total length of the applicator is shortened (see FIG. 7e).

FIGS. 8a to 8d illustrate the damping of microwaves which may emerge from the applicator device and/or the housing of the machine. In the representation shown in FIG. 8a, the individual plastic preforms 10 are shown. Furthermore, a damping device (indicated as a whole with 6) is provided which serves to damp microwaves emerging from the applicator device. This damping element or damping device has a carrier 63 on which a plurality of protrusions 61 is arranged, which here extend in the direction of the plastic preforms. Since the plastic preforms are moved through the applicator device and hence also through the damping device 6, this damping device 6 is optimised so as to also take account of the effects on the holding elements for the plastic preforms which are moved inside this element. Suitable materials for these protective structures which have a low loss are for example as stated above $AL_2O_3$, PTFA, PTFE, quartz, PEI, Igus A500 and similar.

In principle, the material of the channel 45 through which the plastic preforms are transported may be coated with a structure (for example with thin plates) in order to separate the volume of this channel from the other regions of the applicator device by means of a low-loss material. The reason is to reduce the contamination of the applicator device and also to facilitate maintenance and service of the applicator device.

Coating the inner walls of the applicator is one possibility. Another possibility is to construct a separating device from dielectric material in order to isolate the actual material channel (region of applicator through which preforms pass) from the remaining region of the applicator.

In a preferred embodiment, the applicator device or channel 45 of the applicator device comprises an air flushing system for reducing the contamination of the applicator device. Thus, one or a plurality of air nozzles may be provided, which in particular from time to time bombard the interior of the applicator device with air, for example also with sterile air.

Figure 8A:
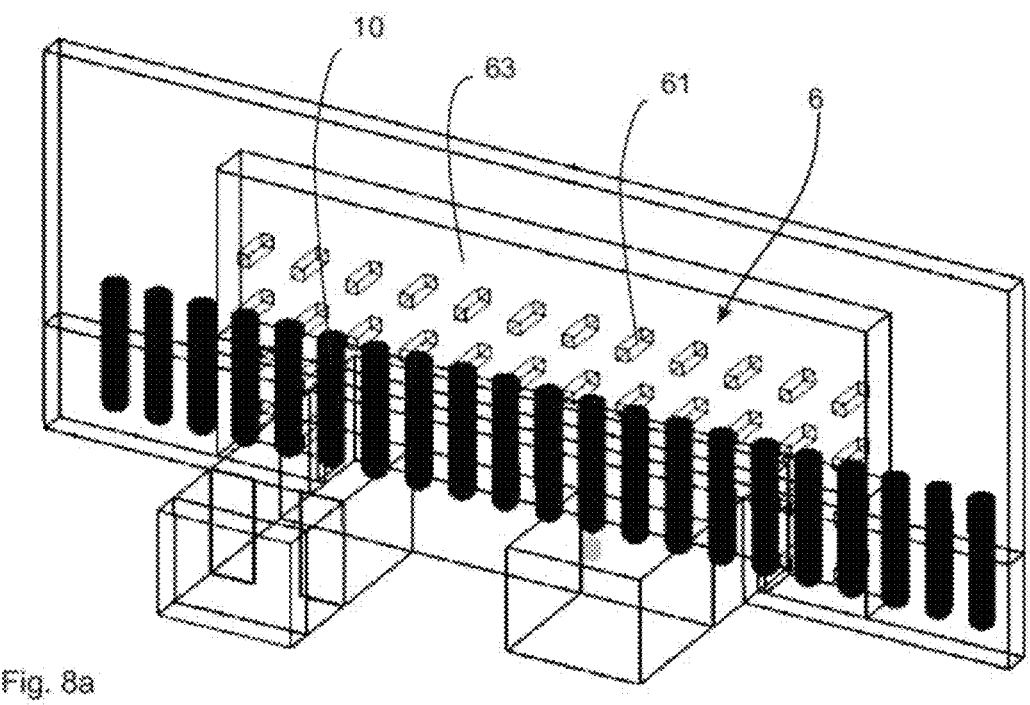
FIGS. 8a-8d four representations of damping devices.
Figure 8D:
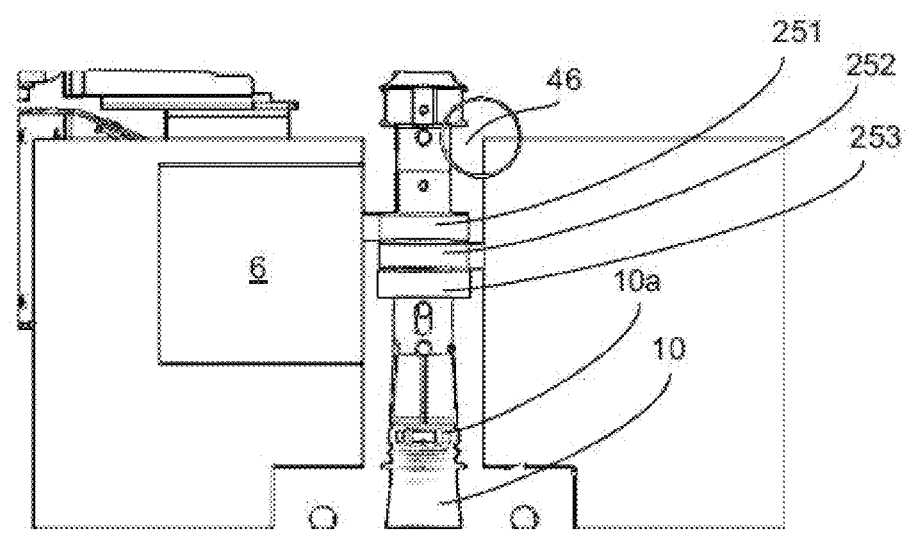
Figure 8B:
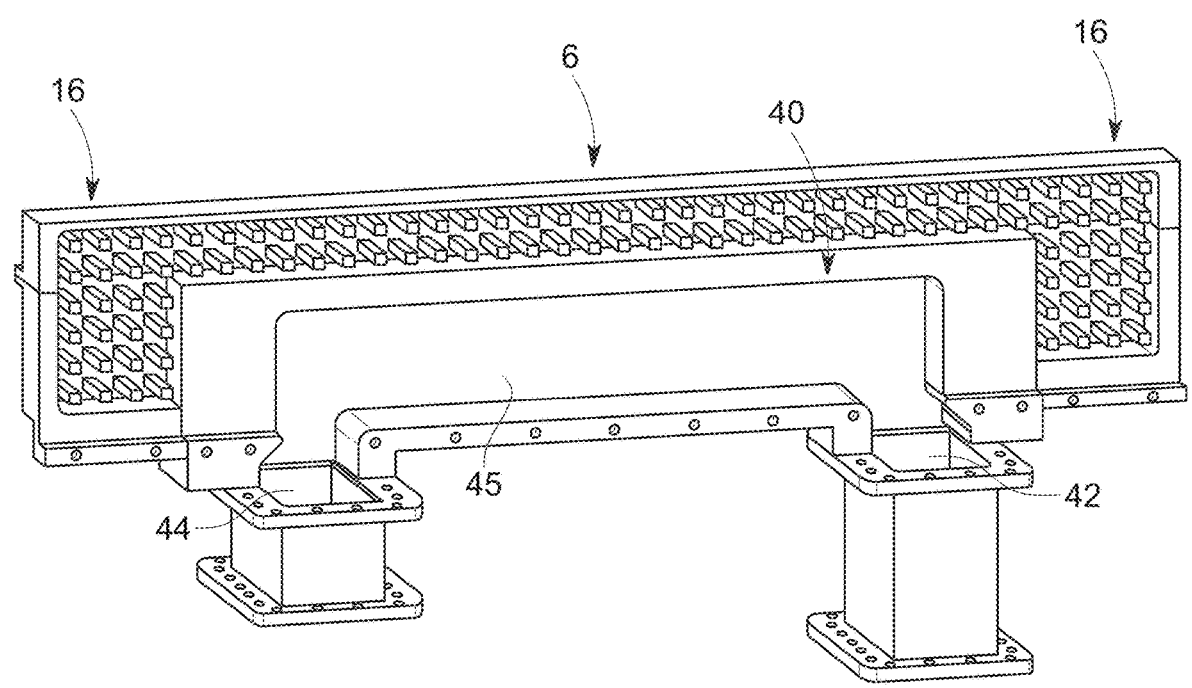

FIG. 8b shows a further representation of the apparatus according to the invention with the damping device 6 and further lateral damping devices 16. The damping devices 16 and the damping device 6 may be formed on a common carrier 61 or 63. A plurality of protrusions 61 is also provided in the region of the damping device 16. Reference sign 45 indicates the channel through which the plastic preforms—or more precisely, their base bodies—are conveyed. Here again, the coupling device 42 can be seen together with the decoupling device 44 in which tuning elements (not shown here) are also arranged.

Figure 8C:
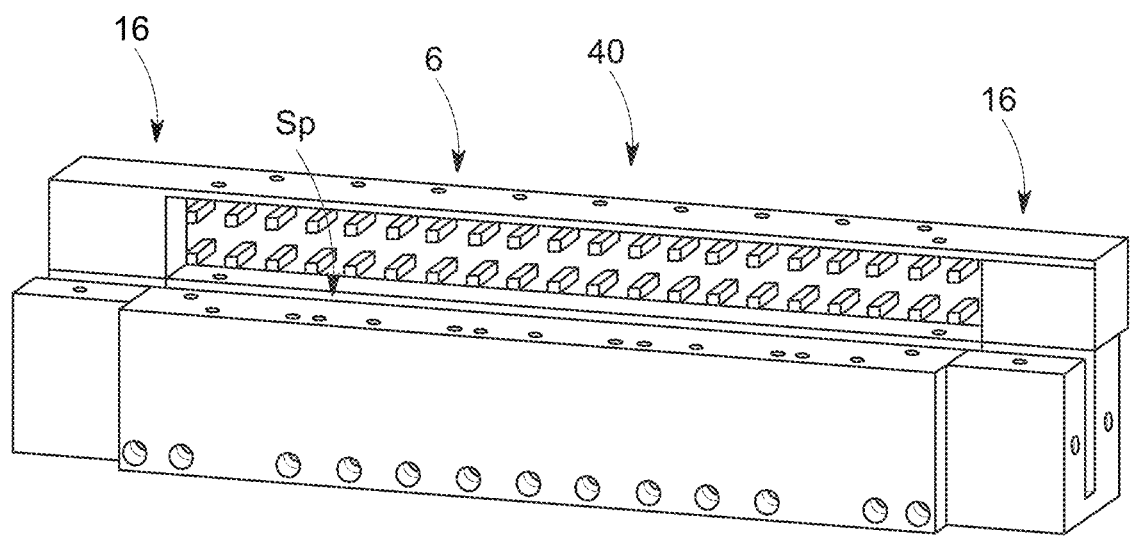

FIG. 8c shows a further embodiment of an applicator device. In this case, metal blocks are provided as damping devices for the edge regions 16 and serve to block (non-wandering) waves. Again, the above-mentioned protrusions 61 are provided between these metal blocks.

FIG. 8d shows an embodiment in which the plastic preform 10 is conveyed through the space (only partially shown) of the applicator device. Here again, the damping device 6 is provided which in particular ensures that the microwaves are damped in the region of the gap 46 inside which the holding device 200 is transported. The holding device 200 here comprises three guide devices 251, 252 and 253 which serve for lateral guidance of the holding device 200. Microwave radiation damping is also provided in the region of the circle, so that it cannot emerge from the resonator or applicator device or at least is sufficiently greatly damped. As stated above, for example metal brushes or similar could be used. Also, a λ/4 trap could be used for damping.

FIGS. 9a to 9d show several representations of different apparatus layouts. In the variant shown at the top in FIG. 9a, a power source 92 is provided which supplies electrical energy to several microwave generators 94 via two or more branches. These microwave generators 94 each supply microwave sources 96. Circulators and water loads 98 adjoin each of these microwave sources 96. Then via a power splitter 95, the microwave power is divided over two applicator devices 40.

Figure 9A:
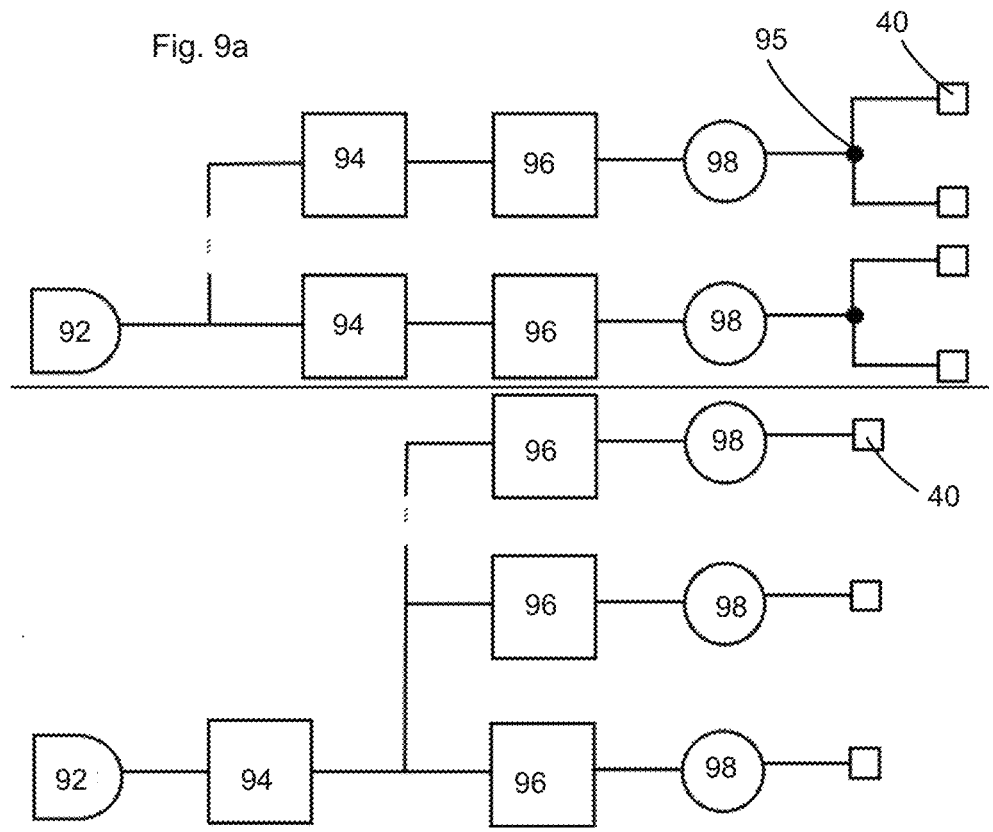
FIGS. 9a-9d four representations of layouts for applicator devices.

In the variant shown at the bottom in FIG. 9a, a power source 92 is also provided, but here there is only one microwave generator 94. This microwave generator 94 again here supplies three or more microwave sources 96. A water load or circulator 98 is assigned to each microwave source 96, together with a respective applicator device 40. It would however also be possible to combine the variants from FIG. 9a.

Figure 9B:
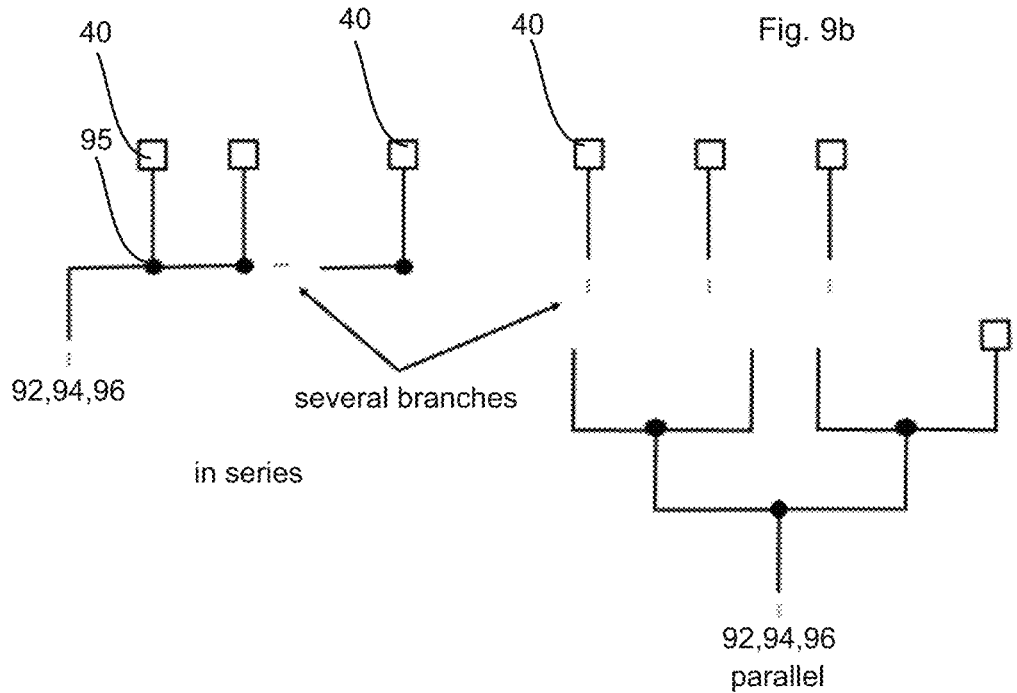
Figure 9C:
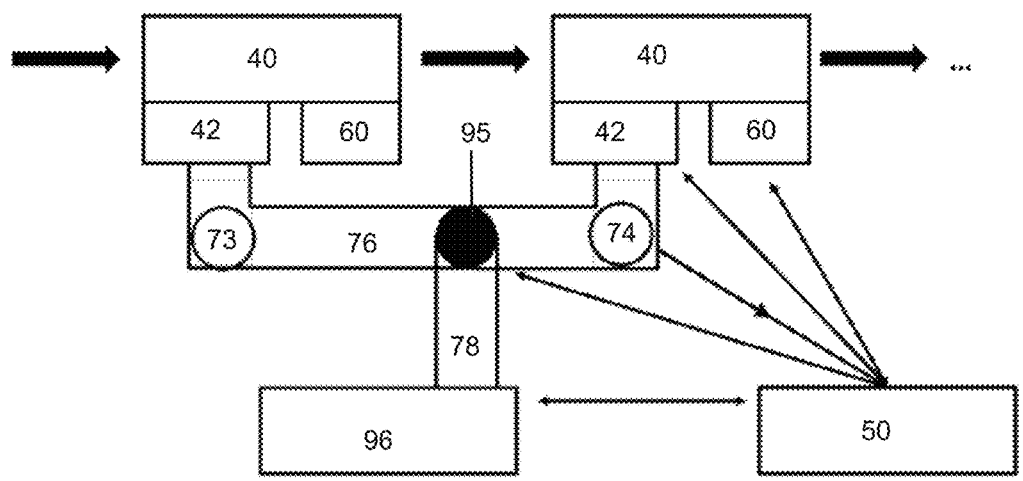

Also, other procedures could be selected. It would also be possible that, starting from a source, several applicator devices are supplied directly via power splitters, or power splitters are arranged successively, and firstly, starting from a microwave source, a power splitter divides this power over two branches and each of these two branches contain a subsequent power splitter which divides the power over a further two branches. Such a procedure is shown in FIG. 9b.

In the embodiment shown in FIG. 9c, again a microwave generator is provided together with a microwave source 96 which transmits the microwaves to a power splitter via a waveguide 78. Starting from this power splitter, two applicators 40 are supplied. Reference signs 73 and 74 indicate sensor devices which for example measure an input power, an absorbed power, an impedance or similar. The plastic preforms are transported along the arrows from one applicator device 40 to the next. Reference sign 50 indicates a control device which for example can also receive signals from the sensor devices 73 and 74, and conversely can actuate the power splitter 95. Furthermore, the control device 50 can also actuate the individual applicator devices 40, or more precisely the coupling elements 42 and the tuning devices 60. In addition, the control device 50 may also actuate the generator and the microwave source 96.

The control device 50 is preferably regulating device so that the entire system can be regulated.

Figure 9D:
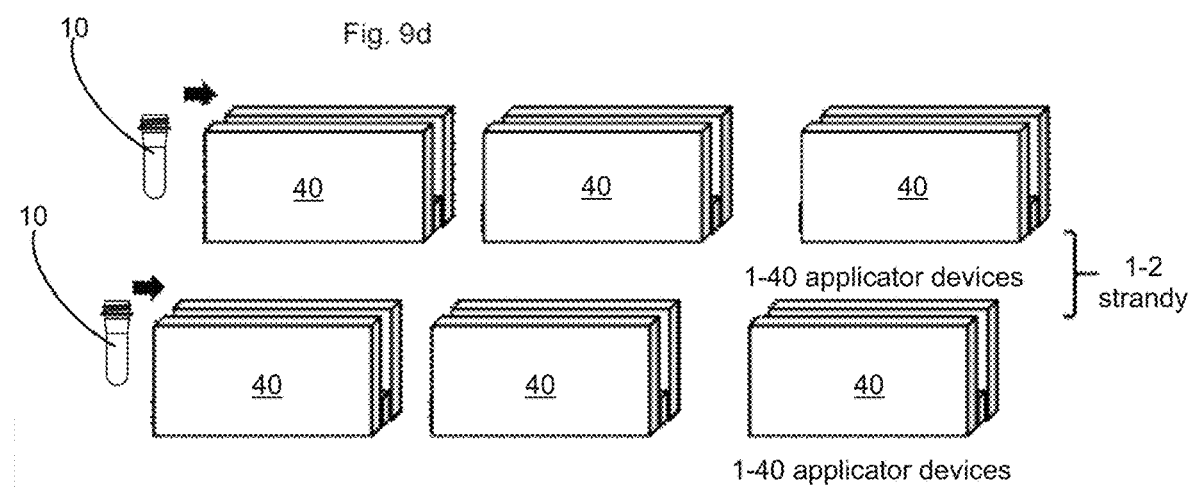

In the situation shown in FIG. 9d, plastic preforms can be guided on two strands, i.e. on parallel transport paths, through several applicator devices 40 arranged successively. It would also be possible for more than two article strands or transport branches to be provided. In this way, the throughput of the heating device as a whole can be increased.

Figure 10A:
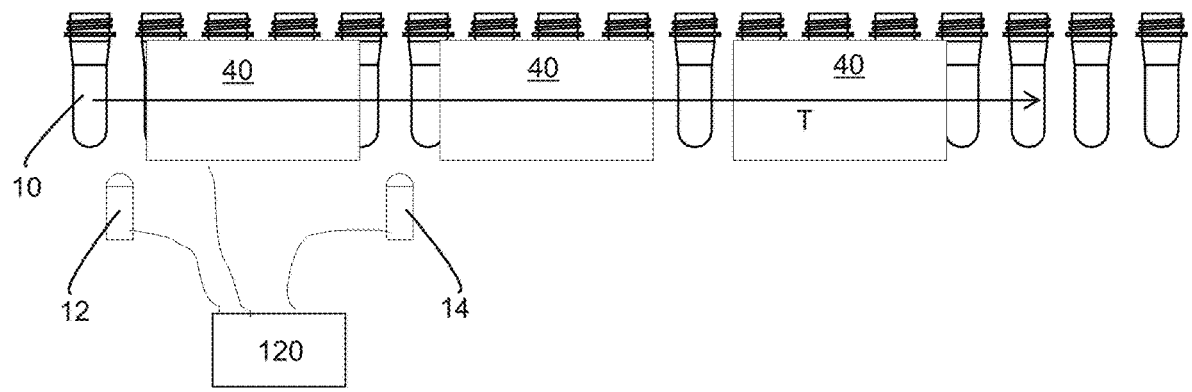
FIGS. 10a-10d four representations to illustrate a control system of the applicator devices.

FIGS. 10a to 10d show various embodiments of an apparatus according to the invention with additional measuring devices. FIG. 10a shows an arrangement in which the plastic preforms 10 are transported along a transport path T through a plurality of successively arranged applicator devices 40. Reference sign 12 indicates a first sensor device, such as in particular a pyrometer, which measures a temperature of the plastic preforms in contactless fashion. The first sensor device 12 measures the temperature of the plastic preforms before entry into the first applicator device 40. The second sensor device 14 measures the temperature of the plastic preforms after they leave the first applicator device. It would however also be possible to integrate such sensor devices in the applicator device itself.

Reference sign 120 indicates a control device which communicates both with the two sensor devices 12 and 14 and also with the actual applicator device 40. Instead of a pyrometer, it would also be possible to use an infrared camera. In particular at the inlet before the first applicator device 40. Further sensor devices could also be provided between the second and third applicator device and at the end of the third applicator device. The first applicator device on the left may be used in particular to bring the plastic preforms to a uniform temperature level.

Figure 10B:
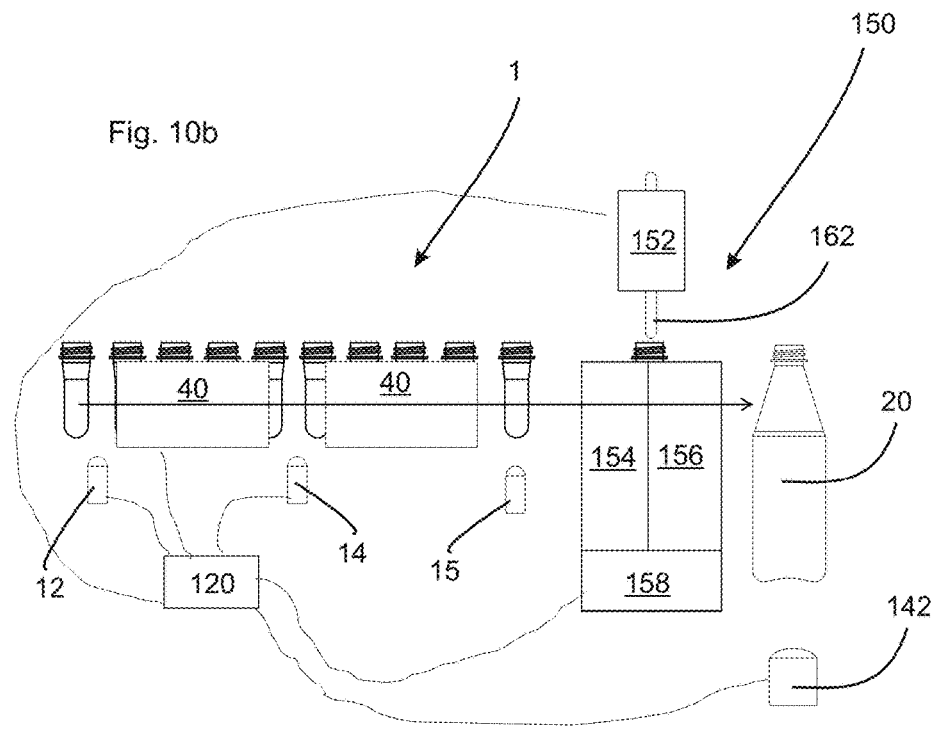

FIG. 10b shows a further embodiment of the apparatus according to the invention. In this embodiment, a moulding device, such as in particular a blow-moulding machine 150, is arranged downstream of the actual heating device 4. This blow-moulding machine comprises a blow-mould with a first side part 154, a second side part 156 and a base part 158. These three parts together form a cavity, inside which the plastic preform is expanded into a finished container 20 by bombardment with a medium, in particular compressed air. Instead of compressed air, the plastic preform could also be expanded with a liquid to be filled later.

Furthermore, these side parts 154 and 156 are arranged on side part carriers (not shown). The base part 158 may also be arranged on a carrier (not shown). To open and close the blow-moulds, preferably the side parts are pivoted apart and the base part 158 is moved away.

Reference sign 162 refers to a stretching rod. Reference sign 152 indicates a valve block which controls the bombardment of the plastic preforms with blowing air.

In the variant shown in FIG. 10b, again several sensor devices 12, 14 and 16 are depicted. Reference sign 120 again indicates a control device, wherein however here also the moulding unit 150 and for example also the valve block 152 are integrated in the control system.

Reference sign 142 indicates a further inspection device which checks the finished blown containers. In particular, the moulding of a base may be monitored, or other properties such as in particular a wall thickness distribution of the finished container. For this, the inspection or sensor device 142 may comprise a plurality of sensor elements which monitor the wall thicknesses of the container along its longitudinal direction. The control unit 120 preferably also allows an IPC (inter-process communication). In this way, the entire production process for the containers 20 can be self-regulating.

Preferably, the individual devices also allow different tempering of the plastic preforms in different regions in the longitudinal direction of the plastic preforms. In particular, a final temperature before stretch blow-moulding, i.e. a temperature measured by the sensor device 15, may be used as an important controlled variable since here the heating process is concerned and only its effect on the final container quality.

Figure 10C:
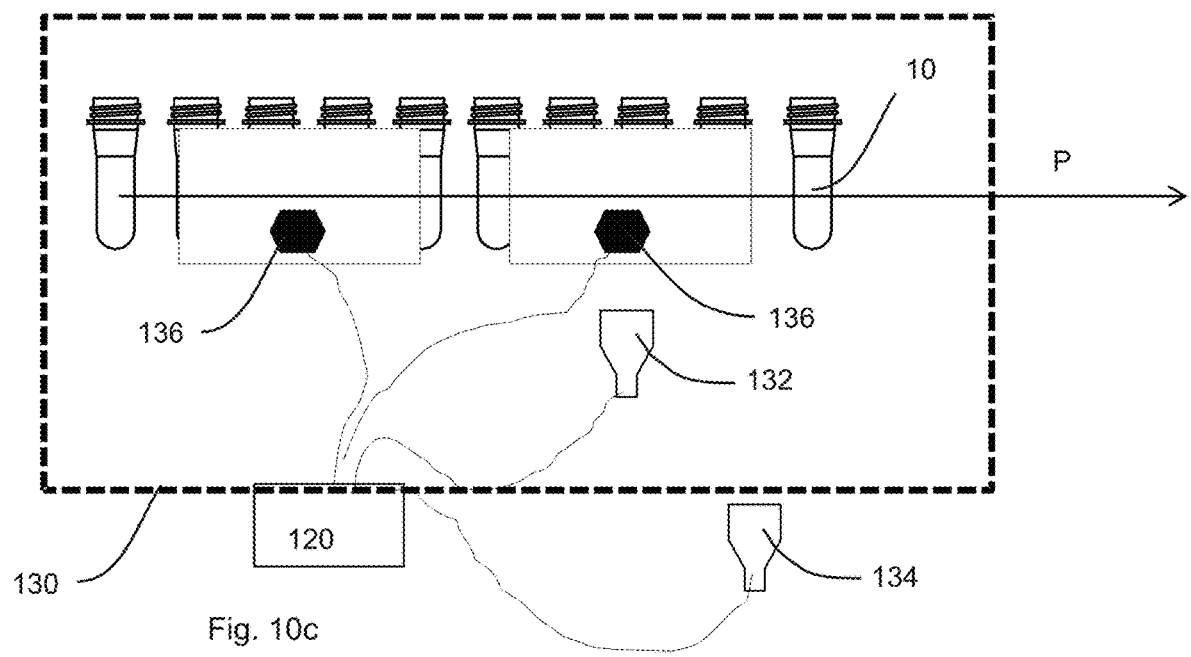

FIG. 10c shows a representation of the apparatus with several measuring devices. In this embodiment, the focus in particular is on detecting the occurrence of faults and the emergence of microwaves. To this end, the apparatus has two sensor devices 136, each assigned to an applicator device 40. These sensor devices may in particular detect plasma ignition. These sensor devices 136 may for example be photodiodes which look into the resonator or into the channel of the applicator device. These or the control device may switch off the microwave energy supply immediately in the event of plasma ignition.

Reference signs 132 and 134 refer to the first and second sensor devices which serve to establish whether microwaves are emerging from the applicator devices. Here it is possible that the first sensor device 132 is arranged inside a housing 130 and establishes whether microwaves emerge from the applicator devices 40. A second sensor device 134 may be arranged outside the housing 130, again to establish whether microwaves still emerge from the housing. If either of the two sensor devices 132 and 134 indicates too high a measurement value for the microwave energy, the control device 120 may switch off the respective applicator devices.

Figure 10D:
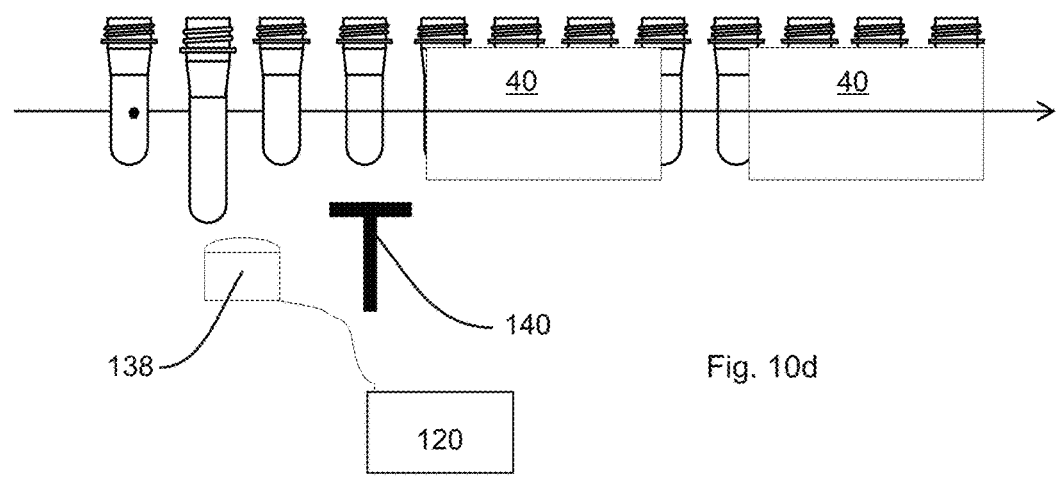

In the variant shown in FIG. 10d, a further sensor or measuring device 138 is provided upstream of the actual applicator device 40. This measuring device is suitable and intended for determining geometric properties of the plastic preforms. Here for example, a preform length. If a plastic preform is too long, this can be ejected from the production stream by means of an ejector device 140. Accordingly, here again the control device 120 is provided which can also control the ejector device 140.

In a preferred microwave system, in addition water cooling is provided, for example at the magnetron, at a circulator and a water load. The applicator device itself may also be water-cooled. For modern semiconductor sources, above all the booster is cooled. This usually takes place with water. Such designs particularly preferably comprise a flowmeter and/or thermometer which detects the temperature of the coolant water. In this way, the correct coolant quantity can be monitored.

Figure 11A:
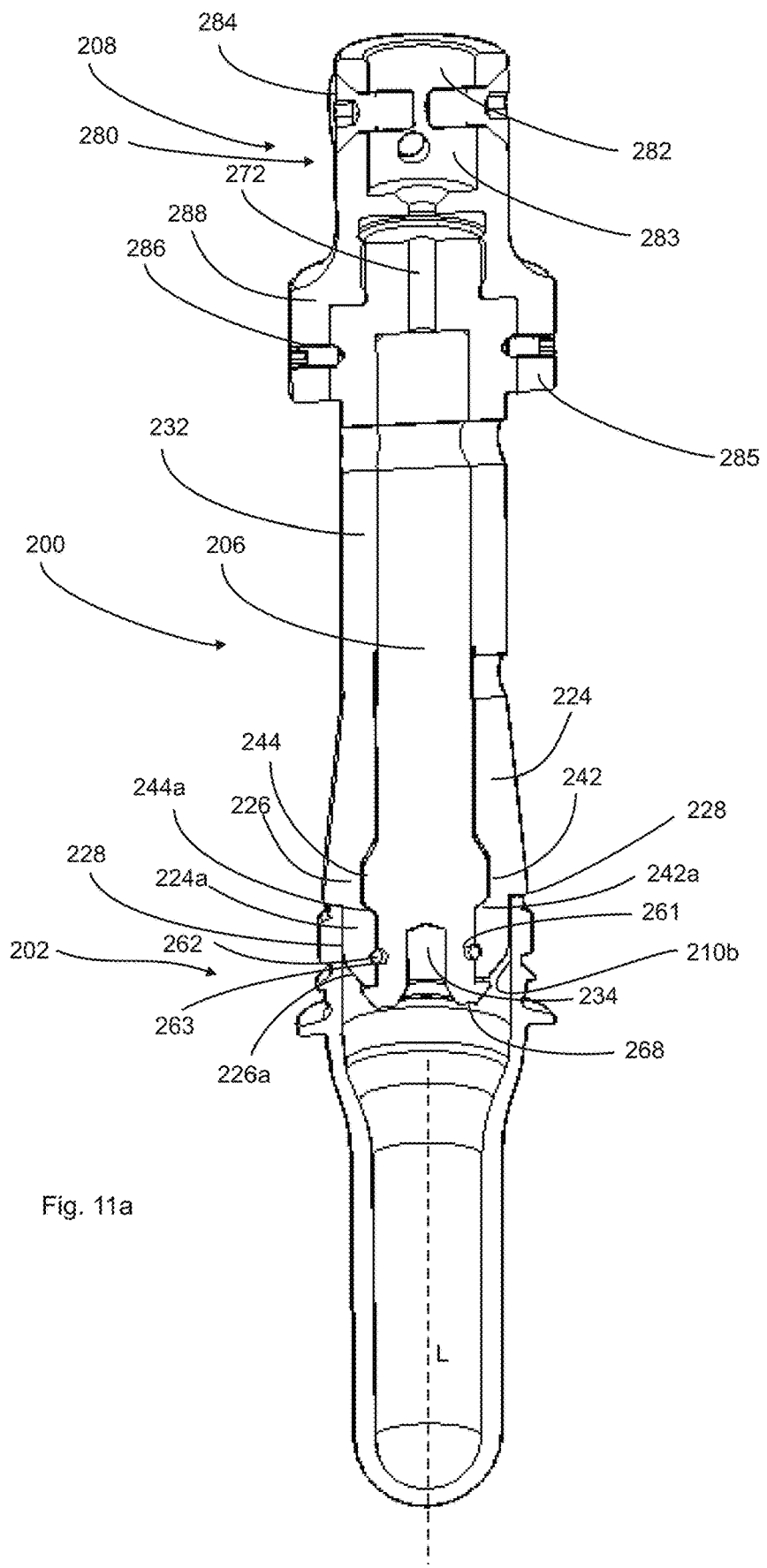

FIG. 11a shows a holding device 200 for the plastic preform 10a according to the prior art by the applicant. This holding element 200 has a relatively short length. It is however pointed out that individual components, such as in particular the actual gripper device 202, may also be used for the holding device according to the invention, so to this extent, reference is made to these features.

FIG. 11a also shows a perspective representation of a holding device 200 according to the invention. This holding device 200 has a holding portion 202 which can be inserted at least partially in a container or in the mouth of a container.

To this end, the holding portion comprises five holding elements 224, 226 (the others are not shown since they are on the back), each of which has a radially inwardly offset end portion 224a, 226a which can be introduced into the mouths of the plastic preforms. Slots 225 are arranged between the individual holding elements and allow a degree of relative movement of the holding devices with respect to each other. In this way, the holding elements 224, 226 can be moved slightly closer to each other on entry into the plastic preform. The slots here preferably run straight and particularly preferably parallel to the longitudinal direction L of the holding device. This initially mentioned circumferential direction of the holding device is thus defined as the circumferential direction about the longitudinal direction.

Reference sign 268 indicates a stop of the spreading body which runs between the individual holding elements or inside these. Reference sign 232 indicates a base body of the holding portion on which the holding elements 224, 226 are arranged and which is formed integrally with the holding elements 224, 226.

Preferably, these holding elements are arranged at least slightly flexibly on the base body 232. This flexible arrangement allows the holding elements to be pressed slightly inward on insertion into a plastic container and now apply a degree of counterforce against the inner wall of the mouth, holding the plastic containers 10 on the holding device 200.

Reference sign 208 indicates a base body or carrier of the holding device 200, on which the holding portion 202—or more precisely, the base body 232—is arranged. The base body 232 forms a cavity in the interior, in which the spreading body is in turn arranged. The base body 232 is arranged in the base body 208 via screw connections 286. Reference sign 285 refers to a receiving region in which the holding portion—or more precisely, the base body 232—is inserted.

Preferably, at least the portion 232 and the holding elements 224, 226 are made from a non-metallic material. Advantageously, the spreading body present in the interior (not visible) is also made from a non-metallic material.

FIG. 11a also shows a holding device 200 with a plastic preform 10 arranged thereon. This plastic preform 10 has a mouth into which the end portion of the holding device is inserted in order to hold the plastic preform.

FIG. 11a also shows a sectional representation of the holding device 200 according to the invention. Again, two holding elements 224 and 226 can be seen. It is evident that the spreading body 206 is arranged inside the holding elements, wherein the reference sign 262 refers to the spreading element which defines how far, with the spreading body inserted, the two holding elements 226 and 224 (but as a whole all holding elements) should be pressed apart and against the inner wall 210b of the plastic preform. Reference sign 263 indicates a receiving groove of the holding element 226 on which the spreading element 262 lies.

In this context, it is pointed out that the spreading body need not spread out the holding elements 224, 226 in the operating state. Accordingly, the spreading body could also be called a supporting body which supports the holding element radially inwardly. However, the holding elements are also spread out at least slightly on extraction of the spreading body from the base body.

Reference sign 268 in turn indicates the lower stop on which the holding elements 224, 226 lie.

Reference sign 286 again refers to screw devices, such as here grub screws, with which the carrier 208 is attached to the base body 232 and hence also to the holding portion 202.

Reference sign 272 indicates a channel-like opening through which a tool, such as for example a small screwdriver, may be introduced in order to press a spreading body 206 downward in the longitudinal direction L and out of the body 232. In this way, the spreading element 262 is accessible and can be changed.

Using the screw bodies 284, the entire device may be attached to a further element, such as for example a rod-like body, which enters the recess 283. The upper region of the holding device, in particular in the region of the recess and the screw body, as a whole serves as a fixing portion 280 for mounting the holding device on a carrier, such as a chain, or also on shuttles. Reference sign 288 indicates a contact face for mounting the holding device 200 on a carrier.

Thus, for example the holding device may be attached to a drive which also causes the plastic preform 10 to be rotated about its own longitudinal axis. The holding device may however also be arranged on a transport device such as a transport chain, and transported thereby.

Reference sign 244 refers to a circumferential protrusion formed on the spreading body 206. In mounted state, this protrusion engages in grooves or recesses 242 formed in the individual holding elements. It is clear that the geometric forms of these protrusions and recesses are matched to each other. Both the groove and the protrusion have oblique faces 242a, 244a pointing downward, i.e. in the direction of the protrusion. When the spreading body is to be pressed out of the base body 232 or the holding elements, these oblique faces exert a force on the holding elements and spread them apart.

It is also shown that the spreading element 262 is situated relatively close to a lower end of the holding device so that, when the plastic preform is arranged, this is also arranged inside said plastic preform. Preferably, this spreading element is arranged below the protrusion 244 in the longitudinal direction, and preferably between the protrusion and the stop element 268. This is advantageous since in this case, the force to be applied by the spreading element on the holding elements is smaller than when the spreading element 262 is arranged higher.

In this way, it is easier to change the spreading element 262 since the spreading body 206 need not be pushed so far out of the region surrounded by the holding elements. Reference sign 282 indicates an opening arranged in the base body, through which a tool may be inserted for pressing the spreading body 206 out of the base body 232. Reference sign 261 indicates a circumferential groove arranged on the spreading body, in which the spreading element 262 may be placed. The spreading element could also be called a support element corresponding to its function, since it serves to support the holding elements relative to the spreading body, in particular when the holding device is inserted in a plastic preform.

Figure 11B:
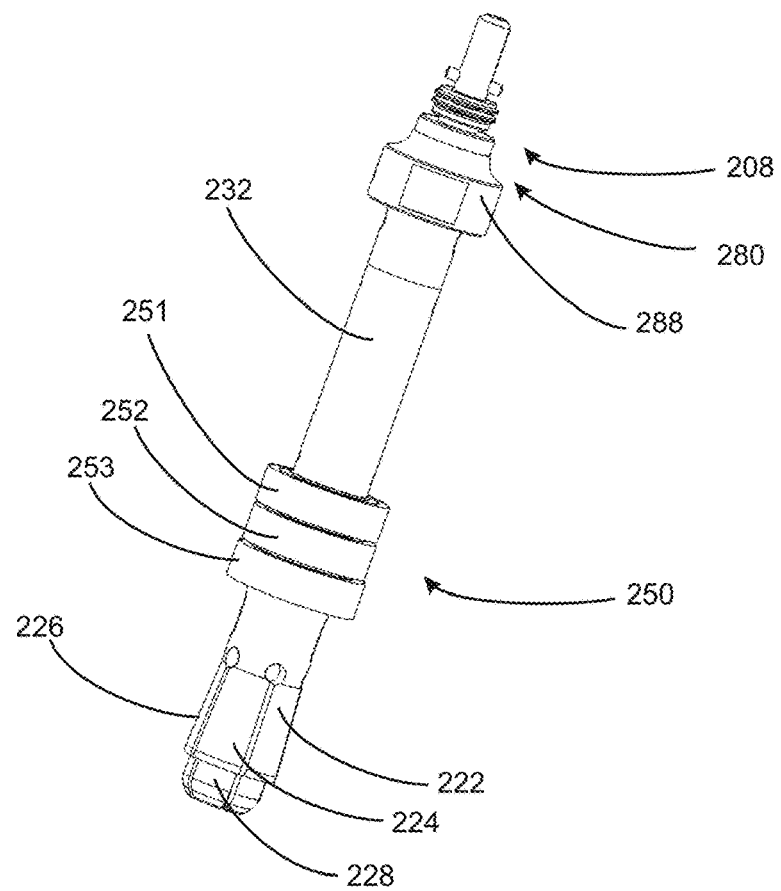

FIG. 11b shows a representation of a holding device according to the invention. This holding device here comprises three guide devices 251, 252 and 253 which serve for lateral guidance of the holding device. These three guide devices are together parts of a guide device indicated 250, which serves for lateral guidance of the holding device 200. The guide devices are here formed as rotatable bodies or outer rings which can roll against further guide means.

Figure 11C:
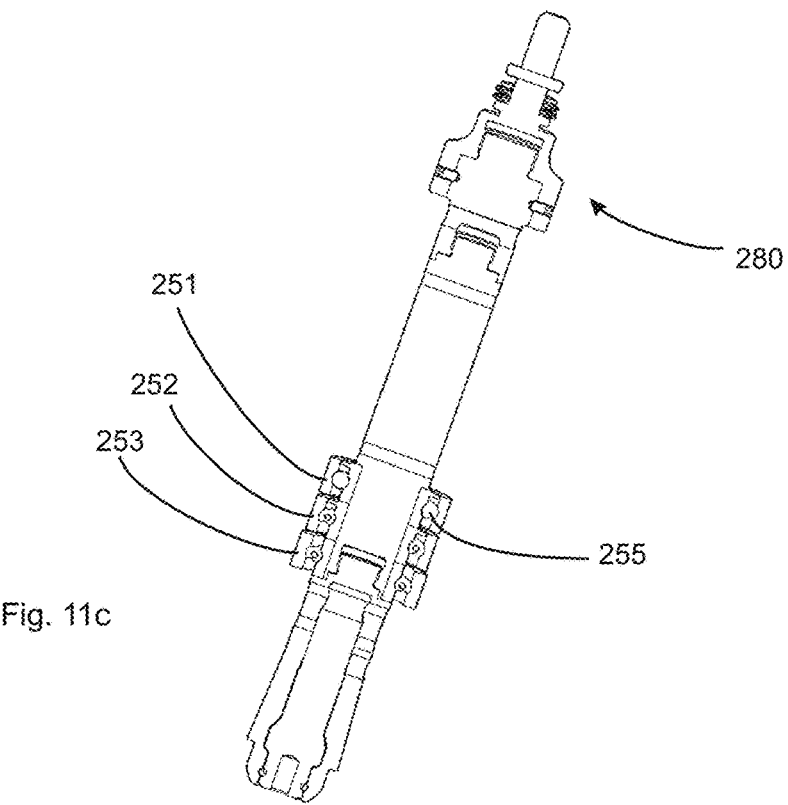

FIG. 11c shows that the guide devices each comprise ball bearings with balls 255 so as to achieve the rotation of the outer rings of these guide devices. It is furthermore clear that the bottom guide device 253 has a slightly larger external cross-section than the two other guide devices 251 and 252. Said guide device 253 serves for rolling against adjacent guide devices of adjacent holding devices.

FIG. 11d illustrates the concept of guidance. It is clear that the guide device 251 rolls against a first rail 273, which in this figure is arranged in front of the guide devices. The guide device 252 rolls against a second rail 274, which is here arranged behind the guide devices, and the guide device 253 rolls against the adjacent guide device.

FIGS. 11e and 11f show two further representations which illustrate the guidance of the holding devices. Because of the concept proposed here, the holding devices are guided in three directions, and as a whole both in the transport direction and perpendicular thereto.

FIGS. 12a to 12d illustrate the function of the abovementioned function elements. The upper partial illustration shows a possible field distribution within the applicator along the longitudinal direction of the plastic preform shown in the lower part image. This field distribution or field profile does not yet lead to the desired heating of the plastic preform.

In the situation shown in the middle partial illustration of FIG. 12a, a function element 8, such as a dielectric element, is introduced into the applicator. It is evident that this function element changes the field distribution inside the applicator and in particular shifts the maximum of the field.

The lower partial illustration of FIG. 12a shows a desired profile of the field distribution. It is evident that the profile shown in the middle partial illustration is already closer to the desired field distribution than the profile shown in the top partial illustration.

FIG. 12b shows a first possible embodiment of a function element 8 arranged inside the applicator. This function element 8 can here be moved sideways in the direction of the double arrow P1 towards the plastic preform.

FIG. 12c shows a further embodiment of a function element 8. This may be configured as a piston-like or rod-like element which can also be moved towards the plastic preform.

FIG. 12d shows a further embodiment of a function element. This is here configured as a dielectric block which is arranged on a base of the applicator device, i.e. below the transport path of the plastic preforms.

FIGS. 13a to 13d illustrate various tempering concepts for a heating device according to the invention. These procedures serve in particular for applying a temperature profile to the plastic preform which changes in the circumferential direction. With the procedure shown in FIG. 13a, the rotational speed n1, n2, n3 of the plastic preforms varies, and hence a non-homogenous temperature profile is applied in the rotation direction.

Figure 13A:
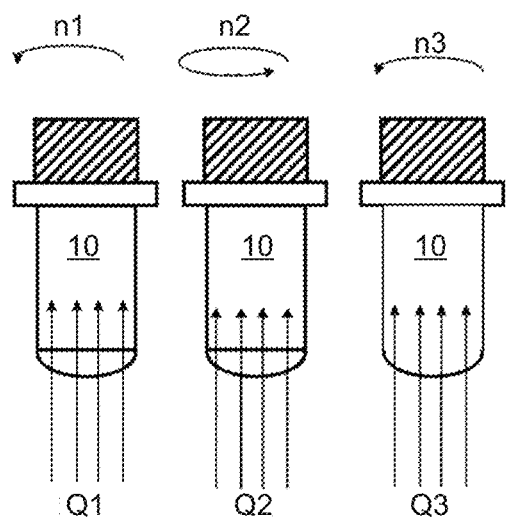
FIG. 13*a*-13*d* four representations to illustrate tempering.
Figure 13B:
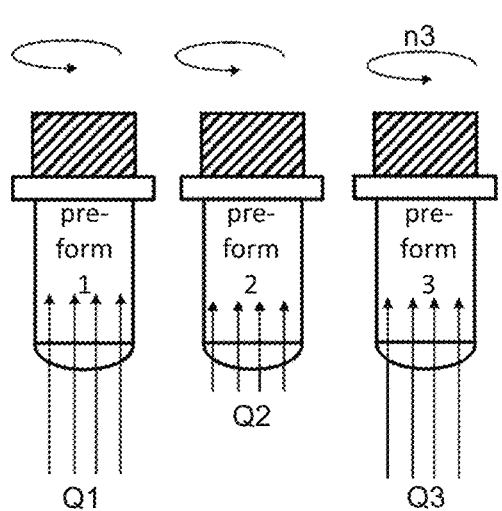

With the procedure proposed in FIG. 13b, within a complete revolution of the plastic preform in the heating module or in the applicator with constant mandrel rotation, the heating energy applied to the plastic preform is varied and hence a non-homogenous temperature profile applied is in the rotation direction.

Figure 13C:
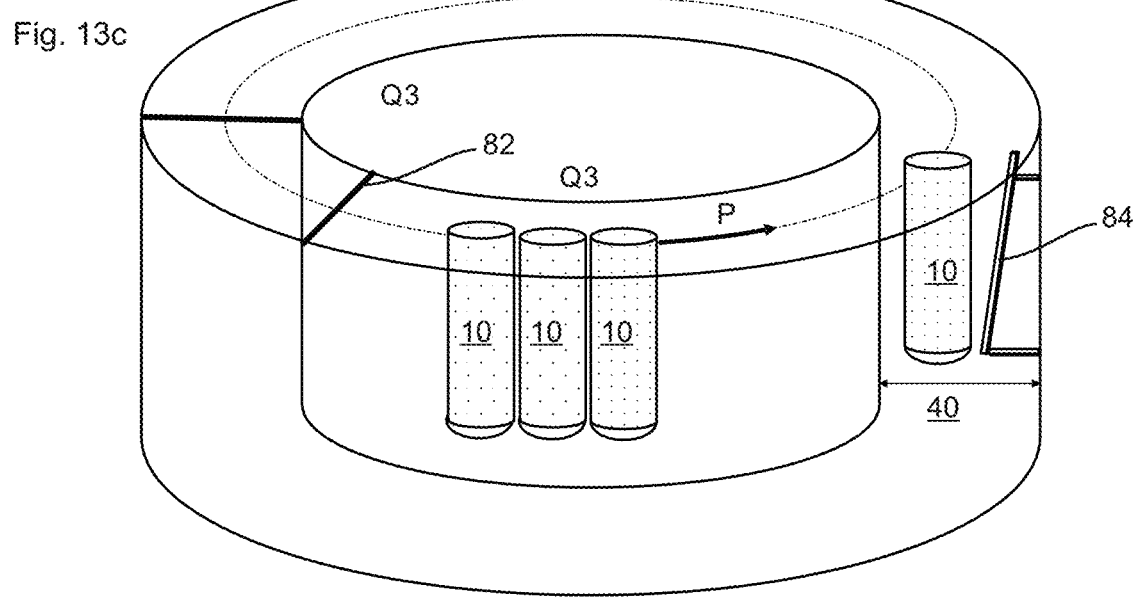

FIG. 13c shows a further possible embodiment of an applicator or resonator. It would also be quite conceivable, and in some cases for example useful with regard to the footprint or arrangement, to configure the heating device as a carousel as shown in FIG. 13c. Here, the resonator would have to be curved into a circular form, and either the entire resonator rotates with the preforms or the preforms move through the curved resonator. Also it could be useful to rotate the preforms through the resonator using a synchronous and/or stationary adjustment mechanism for the temperature profiling.

The advantages may be that any temperature profiling devices could be integrated more easily, or it would be easier to regulate the preform temperature per preform.

Reference sign 82 indicates a region in which the plastic preforms are delivered to the heating device, and reference sign 40 again indicates the applicator through which the plastic preforms 10 are transported. Reference sign 84 indicates an assembly which is suitable and intended for temperature profiling.

Figure 13D:
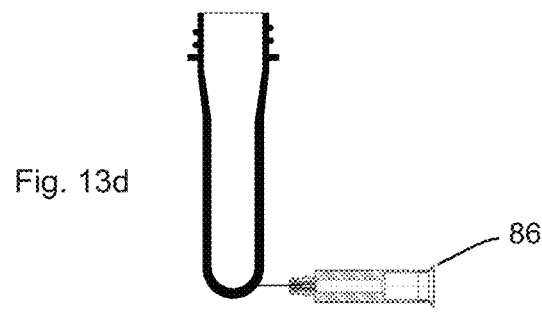

FIG. 13d shows a further possible procedure for achieving a temperature profiling. During the heating phase or after the heating phase, or during the transfer phase following the heating phase, a local reduction in temperature may be achieved for example by means of a Vortec nozzle 86 and/or by surface cooling and/or by contact (Proshape) or in another fashion. It may also be advantageous to cool simultaneously during the heating phase, in order to protect certain regions from overheating or achieve a specific temperature profiling. It could also be possible to cool the plastic preform to a specific, definable temperature by cooling, and to structure the cooling system as a closed control loop. The correcting variable with which the fan or similar is operated would then be the controlled variable with which the temperature of the plastic preform is set.

Figure 14A:
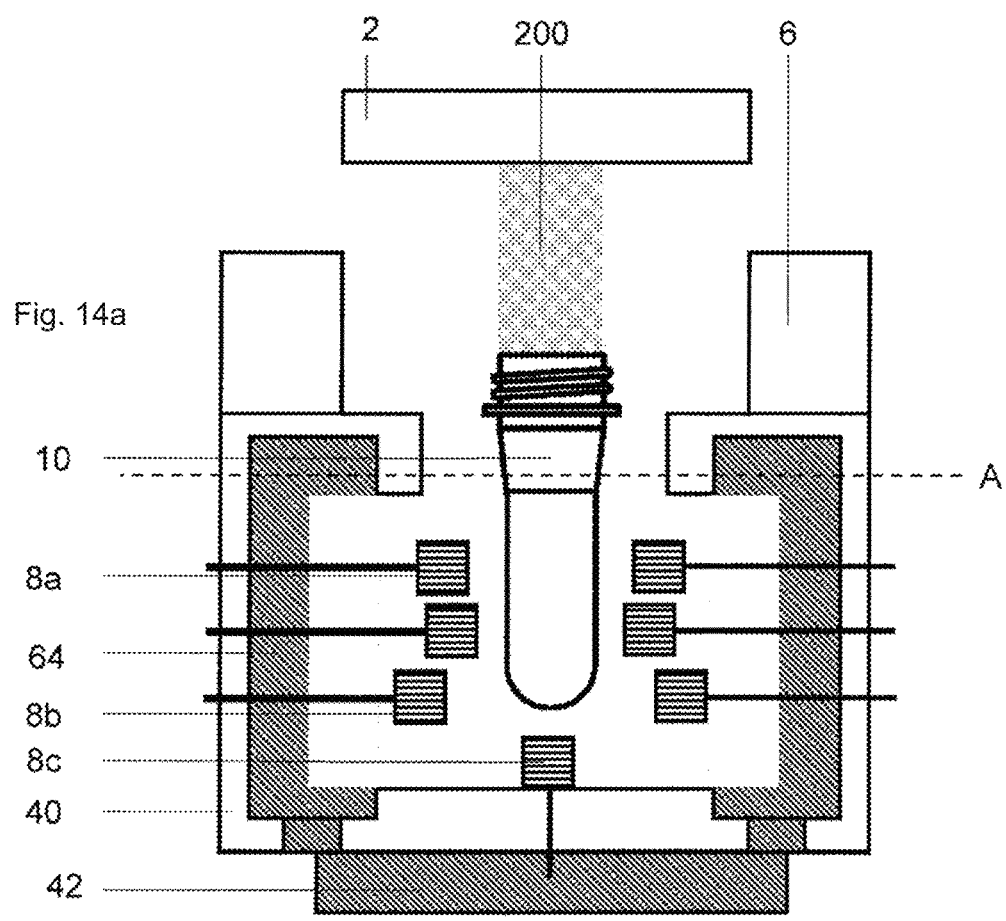
FIG. 14*a*-*b* two representations of an apparatus according to the invention in a further embodiment.

FIG. 14a shows a further embodiment of the apparatus according to the invention. In this embodiment, a plurality of function elements 8a-8c are arranged inside the applicator device. It is evident that opposing function elements are assigned to the function elements marked with reference signs 8a-8c.

Here, the function elements arranged mutually opposite with respect to the plastic preform 10 are arranged in the same position, i.e. in particular arranged symmetrically relative to the transport path of the plastic preforms.

The individual function elements 8a, 8b, 8c are movable in a direction standing perpendicularly to the transport path of the plastic preforms. For function elements 8a and 8b, this is a horizontal direction, and for function element 8c a vertical direction.

Preferably, the individual function elements 8a, 8b, 8c are however movable independently of each other.

Reference sign 64 indicates a tuning element which in FIG. 14a is rotatable relative to a vertical rotation axis, i.e. a rotation axis running parallel to the longitudinal direction of the plastic preforms.

By rotating this tuning element, the cross-section (here semicircular) of the tuning element may be moved closer to the plastic preform. In FIG. 14a, two such tuning elements are shown which lie opposite each other with respect to the plastic preforms or with respect to the transport path.

Figure 14B:
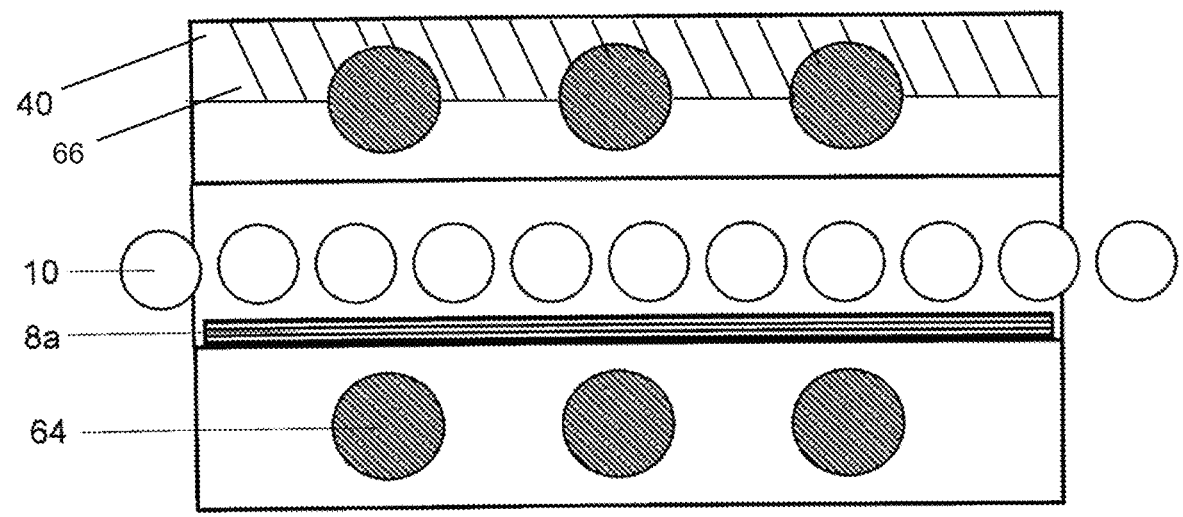

FIG. 14b shows a top view of the apparatus shown in FIG. 14a along line A from FIG. 14a. As a whole, six tuning elements 64 can be seen here, which are arranged on both sides of the transport path of the plastic preforms 10. More precisely, the tuning elements are here arranged preferably symmetrically relative to this tuning path.

As stated above, preferably said tuning elements 64 are arranged in the maxima of the electrical field. Preferably, the tuning elements 64 are arranged equidistantly from each other.

Reference sign 66 indicates a wall in which the individual tuning elements 64 are installed. A corresponding wall (not shown) is preferably also arranged on the opposite side of the transport path.

The individual tuning elements are rotatable relative to these walls. Since, as stated above, the tuning elements each have a semicircular profile (in FIG. 14b, only the circular end portion is visible, see section in FIG. 14a), the rotary position of the tuning elements may establish which proportion of the tuning elements protrudes from the respective walls 66 in the direction of the transport path of the plastic preforms 10. The wall may consist of the same material as the tuning element.

Thus, in one rotational position of the tuning elements, it is possible that these are retracted substantially completely into the wall, and in another rotational position (which is twisted by 180° relative to said first rotational position) they protrude maximally from the wall 66.

Reference sign 8a again indicates a function element which here, as shown in FIG. 14b, extends along the entire applicator device. The further function element 8b shown in FIG. 14a is not visible in FIG. 14b, since it is situated below the function element 8a. A corresponding function element is also present on the opposite side of the transport path, but not shown in FIG. 14b for reasons of clarity.

The applicant reserves the right to claim as essential to the invention all features disclosed in the application documents insofar as said features are novel individually or in combination in relation to the prior art. It is furthermore pointed out, that features have been described in the individual figures which may be advantageous taken in themselves. It will be directly evident to the person skilled in the art that a specific feature described in one figure may also be advantageous without the use of further features from this figure. The person skilled in the art will furthermore recognise that advantages may result from a combination of several features shown in individual or in different figures.

LIST OF REFERENCE SIGNS

1 Apparatus
2 Transport device
6 First damping device
8 Function element
8a,b,c Function elements
10 Plastic preform
10a Mouth of plastic preform
12 Temperature measuring device
14 Temperature measuring device
16 Further damping devices
40 Applicator device
42 Supply device, coupling device
44 Output or decoupling device
45 Channel
46 Gap
48 Gap
49 Gap
52, 54 Deflecting regions
60 Tuning device, tuner
61 Protrusions
62 Protective window
63 Carrier
64 Tuning element
66 Wall
68 Dielectric block
70 Dielectric material
72 Short-circuit element
73, 74 Sensor device
78 Waveguide
82 Region
86 Vortec nozzle
92 Power source
94 Microwave generator
95 Power splitter
96 Microwave source
98 Water loads, circulator
102 Microwave source
104 Head
106 Alternating current source
120 Control device
130 Housing
132 First sensor device
134 Second sensor device
136 Sensor device
138 Sensor or measuring device
140 Ejection device
142 Further inspection device
150 Blow-moulding machine
152 Valve block
154 First side part
156 Second side part
158 Base part
162 Stretching rod
200 Holding device
202 Holding portion
206 Spreading body
208 Base body, carder
210b inner wall of plastic preform
224, 226 Holding elements
224a, 226a End portions of holding elements
225 Slot
232 Base body
242 Grooves, recesses
244 Circumferential protrusion
242a, 244a Oblique faces
250 Guide apparatus
251, 252, 253 Guide devices
255 Ball
261 Circumferential groove
262 Spreading element
263 Receiving groove
268 Stop
272 Channel-like opening
273, 274 Rails
280 Fixing portion
282 Opening
283 Recess
288 Contact face
L Longitudinal direction of plastic preforms

The invention claimed is:

1. An apparatus for heating plastic preforms, said apparatus having a transport device which includes a circulating carrier configured to transport the plastic preforms along a predefined transport path, wherein the transport device comprises holding devices which are arranged on the circulating carrier, for holding the plastic preforms, wherein said transport path has at least one heating portion inside which the plastic preforms are heated with a heating device which is arranged stationarily at least in portions along the transport path and which heats the plastic preforms transported by the transport device during their transport through the heating portion, wherein the heating device has at least one stationary applicator device which is configured for bombarding the plastic preforms with microwaves in order to heat the plastic performs,
wherein
at least in the heating portion, the transport device is arranged relative to the applicator device such that at least parts of the holding devices are arranged outside the applicator device, wherein the applicator device is configured to receive several plastic preforms simultaneously for at least some of the time, and
wherein the applicator device is constructed as an element or unit having a slot through which the plastic preforms are transported, and the apparatus comprises a microwave generating device which is arranged outside the applicator device.

2. The apparatus according to claim 1,
wherein
the transport device is configured to transport plastic preforms in a direction perpendicular to their longitudinal axis during their heating in the heating portion.

3. The apparatus according to claim 1,
wherein
the apparatus has a rotation device configured to rotate the plastic preforms, at least partially, around their longitudinal axis during their heating.

4. The apparatus according to claim 1,
wherein
the holding devices are configured as internal gripper devices which are at least in portions engage in mouths of the plastic preforms in order to hold these.

5. The apparatus according to claim 1,
wherein
the apparatus has at least one shielding device which is configured to at least partially prevent the emergence of microwaves from the applicator device.

6. The apparatus according to claim 5,
wherein
the shielding device comprises one or more elements.

7. The apparatus according to claim 5,
wherein
the operation of at least one shielding device and/or an element of the shielding device is based on destructive interference.

8. The apparatus according to claim 7,
wherein
the apparatus has a tuning device which is configured for regulating a heating power for the plastic preforms and/or for adapting the applicator device.

9. The apparatus according to claim 8,
wherein
the tuning device is configured for matching a resonance frequency and an emission frequency to each other.

10. The apparatus according to claim 9,
wherein
the tuning device has at least one rotatable and/or displaceable tuning element.

11. The apparatus according to claim 10,
wherein
at least one end of the applicator device is open in the transport direction.

12. The apparatus according to claim 1,
wherein
the applicator device is configured for applying to the plastic preforms a temperature profile which changes in their longitudinal direction.

13. The apparatus according to claim 1,
wherein
the applicator device comprises metallic and/or dielectric elements, wherein the metallic and/or dielectric elements are exchangeable and/or at least a position of the elements are changeable.

14. The apparatus according to claim 13,
wherein
at least a position of the elements are changeable in regulated fashion.

15. A method for heating plastic preforms, wherein the plastic preforms are transported along a predefined transport path by a transport device which includes a circulating carrier, wherein the transport device comprises holding devices which are arranged on the circulating carrier for holding the plastic preforms and wherein the transport path has at least one heating portion inside which the plastic preforms are heated with a heating device which is arranged stationarily at least in portions along the transport path and configured to heat the plastic preforms transported by the transport device during their transport through the heating portion, wherein the heating device has a stationary applicator device configured to bombard the plastic preforms with microwaves in order to heat the plastic preforms,
wherein
at least in the heating portion, the transport device is arranged relative to the applicator device such that at least parts of the holding devices are arranged outside the applicator device, wherein the applicator device is configured to receive several plastic preforms simultaneously for at least some of the time, wherein the applicator device is constructed as an element or unit having a slot through which the plastic preforms are transported, and wherein a microwave generating device is provided which is arranged outside the applicator device.

16. The apparatus according to claim 6,
wherein
the operation of at least one shielding device and/or an element of the shielding device is based on destructive interference.

17. The apparatus according to claim 16,
wherein
the apparatus has a tuning device which is configured for regulating a heating power for the plastic preforms and/or for adapting the applicator device.

18. The apparatus according to claim 17,
wherein
the tuning device is configured for matching a resonance frequency and an emission frequency to each other.

19. The apparatus according to claim 18,
wherein
the tuning device has at least one rotatable and/or displaceable tuning element.

20. The apparatus according to claim 19, wherein
at least one end of the applicator device is open in the transport direction.

* * * * *